United States Patent [19]

Fujimoto et al.

[11] Patent Number: 5,499,361
[45] Date of Patent: Mar. 12, 1996

[54] DENSITY PROCESSING METHOD

[75] Inventors: Masaya Fujimoto; Haruo Yamamoto; Shuji Hayashi; Tetsuya Kagawa, all of Osaka, Japan

[73] Assignee: Mita Industrial Co., Ltd., Japan

[21] Appl. No.: 28,172

[22] Filed: Mar. 9, 1993

[30] Foreign Application Priority Data

| Mar. 12, 1992 | [JP] | Japan | 4-089854 |
| Mar. 12, 1992 | [JP] | Japan | 4-089855 |
| Mar. 12, 1992 | [JP] | Japan | 4-089856 |

[51] Int. Cl.⁶ .................................................. G06K 15/00
[52] U.S. Cl. .......................... 395/109; 395/102; 395/101
[58] Field of Search ...................................... 395/109, 101, 395/131, 132, 102, 106; 358/298, 455–460, 534, 296

[56] References Cited

U.S. PATENT DOCUMENTS

| 4,271,436 | 6/1981 | Kurose et al. | 358/296 |
| 4,661,843 | 4/1987 | Sekizawa et al. | 358/520 |
| 4,805,013 | 2/1989 | Dei et al. | 358/80 |
| 4,972,500 | 11/1990 | Ishii et al. | 358/457 |
| 5,093,903 | 3/1992 | Sudoh et al. | 395/110 |
| 5,216,753 | 6/1993 | Ng | 395/109 |
| 5,287,209 | 2/1994 | Hiratsuka et al. | 395/109 |

FOREIGN PATENT DOCUMENTS 415722  3/1991  European Pat. Off. .

*Primary Examiner*—Mark R. Powell
*Assistant Examiner*—Tracy M. Legree
*Attorney, Agent, or Firm*—Beveridge, DeGrandi, Weilacher & Young

[57] ABSTRACT

The present invention is directed to a density processing method in which input gray level-output gray level data are previously generated and stored a first storing device, the input gray level-output gray level data are transferred to a second storing device, and an address in the second storing device is designated on the basis of input gray level data inputted so that output gray level data stored in the specified address in the second storing device is outputted. In the present invention, access addresses to the second storing device are converted depending on the designated copy density, so that input gray level-output gray level characteristics are converted into characteristics corresponding to the designated copy density.

18 Claims, 14 Drawing Sheets

DENSITY PROCESSING METHOD

BACKGROUND OF THE INVENTION

1. Field of the Invention

The present invention relates to a density processing method in an image forming apparatus such as a copying machine.

2. Description of the Prior Art

In a digital color copying machine, a document is first irradiated by an exposure lamp in a scanner section, and its reflected light is detected by a CCD (Charge Coupled Device) and sequentially converted into an electric signal. In this case, an image of the document is separated for each color and for each pixel by the CCD into an electric signal corresponding to the density of each pixel. This electric signal is sent to an image processing section.

In the image processing section, an output of the CCD is digitally converted and then, the variations of the CCD, the exposure lamp and the like are corrected for each signal having colors (B (blue), G (green) and R (red)) (BGR signal) in a shading correcting section. The BGR signal is converted into a toner density signal (a YMC (yellow, magenta and cyan) signal) in a BGR-YMC converting section. In addition, a BK (black) signal is produced from the YMC signal in a BK producing section.

Thereafter, in the YMC signal and the BK signal, the density levels of the respective colors are corrected in accordance with the characteristics of a filter and toner in a color correcting section. Furthermore, in a color converting section, processing, such as color conversion of a designated color, trimming or masking, is performed. Thereafter, in a density processing section, the level of a digital density signal sent is converted depending on a developing color, the copy density designated in an operating section, the type of document image designated in the operating section, and the like. Thereafter, the digital density signal is sent to a printing section through a variable magnification and movement processing section for performing variable magnification and movement processing in the main scanning direction of an image, to accomplish recording on paper.

Meanwhile, in the digital copying machine or the digital color copying machine, density processing using a dither method has been generally performed in the density processing section so as to obtain a gray scale image. A digital color copying machine already developed by the applicant of the present application is so adapted that data representing a gray level of a recording pixel relative to a gray level of a reading pixel (hereinafter referred to as input gray level-output gray level data) have been previously generated using a dither matrix having 2×2 pixels as one block and stored in a memory device, to find data representing a gray level of a recording pixel (hereinafter referred to as output gray level data) corresponding to data representing a gray level of a reading pixel (hereinafter referred to as input gray level data) inputted on the basis of the input gray level-output gray level data. There are 256 gray levels of the reading pixel, and there are 64 gray levels of the recording pixel. A density processing circuit in this copying machine is shown in FIG. 1.

The density processing circuit comprises a CPU 10, a data ROM 11, a table memory 13, and an address generating circuit 12. A plurality of types of input gray level-output gray level data previously generated are stored in the data ROM 11 depending on a developing color (M, C, Y or BK), the copy density designated in an operating section, and the type of document image designated in the operating section.

The CPU 10 transfers one type of input gray level-output gray level data corresponding to the developing color, the copy density designated in the operating section, and the type of document image designated in the operating section out of the plurality of types of input gray level-output gray level data from the data ROM 11 to the table memory 13. Image data representing a gray level of reading pixel (input gray level data) and a signal representing the position of the reading pixel (a pixel position signal) comprising a line signal HSYNC and a dot signal CLK (not shown) are sent to the address generating circuit 12. The address generating circuit 12 outputs a signal for specifying an address storing output gray level data corresponding to the input gray level data and the pixel position signal sent (a pixel in the dither matrix which corresponds to the reading pixel) out of addresses in the table memory 13. Consequently, the output gray level data stored at the specified address is outputted from the table memory 13.

In this copying machine, the number of gray levels of the reading pixel is 256, and the number of pixels constituting one block in the dither matrix is 4. Accordingly, the number of one type of input gray level-output gray level data is 256×4=1024. Such input gray level-output gray level data differ for each developing color (M, C, Y or BK), for each copy density designated in the operating section, and for each type of document image designated in the operating section. It is assumed that there are four types of developing colors, there are 15 levels of the copy density designated in the operating section, and there are three types of document images designated in the operating section, that is, a character, a photograph and a character-photograph mixture. In this case, if the data ROM 11 is a 8-bit memory, 1024×4× 15×3= 184320 bytes is required as the capacity of the data ROM 11. In such a copying machine, therefore, a large-capacity memory device is required to store the input gray level-output gray level data.

Therefore, the applicant of the present application has proposed a method of generating input gray level-output gray level data for each developing color (M, C, Y or BK) and for each type of document image designated in the operating section and making the adjustment of an output gray level based on the copy density designated in the operating section on the basis of the input gray level-output gray level data generated so as to reduce the capacity of the data ROM 11. Specifically, it is a method of finding an output gray level relative to an input gray level on the basis of input gray level-output gray level data corresponding to a developing color and the type of document image designated in the operating section and then, increasing or decreasing the output gray level found by a gray level corresponding to the copy density designated in the operating section, to obtain an output gray level. That is, it is a method of merely adding or subtracting an offset value to or from the output gray level found by the input gray level-output gray level data.

FIG. 19 shows input gray level-output gray level data corresponding to a developing color and the type of document image designated in the operating section, and FIG. 20 shows input gray level-output gray level data obtained by so correcting the input gray level-output gray level data shown in FIG. 19 that output gray level data is larger by a predetermined gray level by the above described method.

It is preferable that the relationship between input gray level data and the density at which printing is actually done is linear. However, the relationship between output gray level data and the density at which printing is actually done is not linear due to characteristics which are inherent to the copying machine. Accordingly, if the relationship between the input gray level data and the output gray level data is made linear, the relationship between the input gray level data and the density at which printing is actually done is not linear. Therefore, input gray level-output gray level data is so generated that the relationship between input gray level data and the density at which printing is actually done is linear in consideration of the relationship between output gray level data and the density at which printing is actually done which is inherent to the copying machine. Therefore, the characteristics of the input gray level-output gray level data generated become non-linear characteristics and characteristics which are inherent to output gray levels.

In a method of merely adding or subtracting an offset value to or from an output gray level found by input gray level-output gray level data, if input gray level-output gray level characteristics obtained by the method shown in FIG. 20 are compared with the original input gray level-output gray level characteristics shown in FIG. 19, the value of an output gray level at a point on the characteristic curve is changed from the value of an output gray level at a corresponding point on the original characteristic curve. Accordingly, the relationship between the output gray level data and the density at which printing is actually done in the original input gray level-output gray level characteristics cannot be maintained. Therefore, the relationship between the input gray level data and the density at which printing is actually done is not linear. Further, in the method of merely adding or subtracting an offset value to or from an output gray level found by input gray level-output gray level data, the range of output gray levels is extremely decreased.

SUMMARY OF THE INVENTION

An object of the present invention is to provide a density processing method in which the capacity of a memory device for storing data representing an output gray level relative to an input gray level (hereinafter referred to as input gray level-output gray level data) can be reduced, and the range of output gray levels is not extremely decreased and the relationship between input gray level data and the density at which printing is actually done can be made linear, as compared with a method of merely adding or subtracting an offset value to or from an output gray level found by input gray level-output gray level data to obtain an output gray level corresponding to the copy density.

In a density processing method in which input gray level-output gray level data are previously generated and stored in first storing means, the input gray level-output gray level data are transferred to second storing means, and an address in the second storing means is specified on the basis of input gray level data inputted so that output gray level data stored in the specified address in the second storing means is outputted, a first density processing method according to the present invention is characterized in that access addresses to the second storing means are converted depending on the designated copy density to convert input gray level-output gray level characteristics into characteristics corresponding to the designated copy density.

The access addresses to the above described second storing means are transfer destination addresses from the first storing means to the second storing means corresponding to the input gray level-output gray level data or specified addresses in the second storing means corresponding to the input gray level data inputted.

The access addresses to the second storing means may be converted by adding or subtracting a value corresponding to the designated copy density, to convert the input gray level-output gray level characteristics into characteristics corresponding to the designated copy density.

Furthermore, the access addresses to the second storing means may be so converted, if the designated copy density is higher than the reference copy density, that the rate of increase of an output gray level relative to an input gray level is higher in a lower density portion and that the higher the designated copy density is, the higher the rate of increase thereof is, to convert the input gray level-output gray level characteristics into characteristics corresponding to the designated copy density.

Additionally, the access addresses to the second storing means may be so converted, if the designated copy density is lower than the reference copy density, that the rate of decrease of an output gray level relative to an input gray level is higher in a higher density portion and that the lower the designated copy density is, the higher the rate of decrease thereof is, to convert the input gray level-output gray level characteristics into characteristics corresponding to the designated copy density.

Furthermore, the access addresses to the second storing means may be so converted, if the designated copy density is higher than the reference copy density, that the rate of increase of an output gray level relative to an input gray level is higher in a lower density portion and that the higher the designated copy density is, the higher the rate of increase thereof is, and may be so converted, if the designated copy density is lower than the reference copy density, that the rate of decrease of an output gray level relative to an input gray level is higher in a higher density portion and that the lower the designated copy density is, the higher the rate of decrease thereof is, to convert the input gray level-output gray level characteristics into characteristics corresponding to the designated copy density.

In a density processing method in which input gray level-output gray level data are previously generated and stored in first storing means, the input gray level-output gray level data are transferred to second storing means, and an address in the second storing means is specified on the basis of input gray level data inputted so that output gray level data stored in the specified address in the second storing means is outputted, a second density processing method according to the present invention is characterized by comprising the steps of converting transfer destination addresses to the second storing means corresponding to the input gray level-output gray level data depending on the designated copy density, finding, when blank transfer destination addresses which do not exist in transfer destination addresses obtained by the conversion exist in portions assigned small addresses of storage areas holding the input gray level-output gray level data in the second storing means, output gray level data corresponding to the blank transfer destination addresses on the basis of output gray level data corresponding to the minimum value of the transfer destination addresses obtained by the conversion, and generating new output gray level data corresponding to all the storage areas holding the input gray level-output gray level data in the second storing means from the foregoing steps to transfer the same to the second storing means.

In a density processing method in which input gray level-output gray level data are previously generated and stored in first storing means, the input gray level-output gray level data are transferred to second storing means, and an address in the second storing means is specified on the basis of input gray level data inputted so that output gray level data stored in the specified address in the second storing means is outputted, a third density processing method according to the present invention is characterized by comprising the steps of converting transfer destination addresses to the second storing means corresponding to the input gray level-output gray level data depending on the designated copy density, finding, when blank transfer destination addresses which do not exist in transfer destination addresses obtained by the conversion exist in portions assigned large addresses in storage areas holding the input gray level-output gray level data in the second storing means, output gray level data corresponding to the blank transfer destination addresses on the basis of output gray level data corresponding to the maximum value of the transfer destination addresses obtained by the conversion, and generating new output gray level data corresponding to all the storage areas holding the input gray level-output gray level data in the second storing means from the foregoing steps to transfer the same to the second storing means.

In a density processing method in which input gray level-output gray level data are previously generated and stored in first storing means, the input gray level-output gray level data are transferred to second storing means, and an address in the second storing means is specified on the basis of input gray level data inputted so that output gray level data stored in the specified address in the second storing means is outputted, a fourth density processing method according to the present invention is characterized by comprising the steps of converting transfer destination addresses to the second storing means corresponding to the input gray level-output gray level data depending on the designated copy density, finding, when blank transfer destination addresses which do not exist in transfer destination addresses obtained by the conversion exist in portions assigned small addresses in storage areas holding the input gray level-output gray level data in the second storing means, output gray level data corresponding to the blank transfer destination addresses on the basis of output gray level data corresponding to the minimum value of the transfer destination addresses obtained by the conversion, finding, when blank transfer destination addresses which do not exist in the transfer destination addresses obtained by the conversion exist in portions assigned large addresses in the storage areas holding the input gray level-output gray level data in the second storing means, output gray level data corresponding to the blank transfer destination addresses on the basis of output gray level data corresponding to the maximum value of the transfer destination addresses obtained by the conversion, and generating new output gray level data corresponding to all the storage areas holding the input gray level-output gray level data in the second storing means from the foregoing steps to transfer the same to the second storing means.

In a density processing method in which input gray level-output gray level data are previously generated using a dither matrix and stored in first storing means, the input gray level-output gray level data are transferred to second storing means, and an address in the second storing means is specified on the basis of input gray level data inputted so that output gray level data stored in the specified address in the second storing means is outputted, a fifth density processing according to the present invention is characterized by comprising the steps of converting transfer destination addresses to the second storing means corresponding to the input gray level-output gray level data depending on the designated copy density, finding, when blank transfer destination addresses which do not exist in transfer destination addresses obtained by the conversion exist in portions assigned small addresses in storage areas holding the input gray level-output gray level data in the second storing means, patterns of output gray level data corresponding to the blank transfer destination addresses on the basis of the original input gray level-output gray level data to find the output gray level data corresponding to the blank transfer destination addresses on the basis of the patterns found and output gray level data corresponding to the minimum value of the transfer destination addresses obtained by the conversion, and generating new output gray level data corresponding to all the storage areas holding the input gray level-output gray level data in the second storing means from the foregoing steps to transfer the same to the second storing means.

In a density processing method in which input gray level-output gray level data are previously generated using a dither matrix and stored in first storing means, the input gray level-output gray level data are transferred to second storing means, and an address in the second storing means is specified on the basis of input gray level data inputted so that output gray level data stored in the specified address in the second storing means is outputted, a sixth density processing method according to the present invention is characterized by comprising the steps of converting transfer destination addresses to the second storing means corresponding to the input gray level-output gray level data depending on the designated copy density, finding, when blank transfer destination addresses which do not exist in transfer destination addresses obtained by the conversion exist in portions assigned large addresses in storage areas holding the input gray level-output gray level data in the second storing means, patterns of output gray level data corresponding to the blank transfer destination addresses on the basis of the original input gray level-output gray level data to find the output gray level data corresponding to the blank transfer destination addresses on the basis of the patterns found and output gray level data corresponding to the maximum value of the transfer destination addresses obtained by the conversion, and generating new output gray level data corresponding to all the storage areas holding the input gray level-output gray level data in the second storing means from the foregoing steps to transfer the same to the second storing means.

In a density processing method in which input gray level-output gray level data are previously generated using a dither matrix and stored in first storing means, the input gray level-output gray level data are transferred to second storing means, and an address in the second storing means is specified on the basis of input gray level data inputted so that output gray level data stored in the specified address in the second storing means is outputted, a seventh density processing method according to the present invention is characterized by comprising the steps of converting transfer destination addresses to the second storing means corresponding to the input gray level-output gray level data depending on the designated copy density, finding, when blank transfer destination addresses which do not exist in transfer destination addresses obtained by the conversion exist in portions assigned small addresses in storage areas holding the input gray level-output gray level data in the second storing means, patterns of output gray level data corresponding to the blank transfer destination addresses on the basis of the original input gray level-output gray level data to find the output gray level data corresponding to the blank transfer destination addresses on the basis of the patterns found and output gray level data corresponding to the minimum value of the transfer destination addresses obtained by the conversion, finding, when blank transfer destination addresses which do not exist in the transfer destination addresses obtained by the conversion exist in portions assigned large addresses in the storage areas holding the input gray level-output gray level data in the second storing means, patterns of output gray level data corresponding to the blank transfer destination addresses on the basis of the original input gray level-output gray level data to find the output gray level data corresponding to the blank transfer destination addresses on the basis of the patterns found and output gray level data corresponding to the maximum value of the transfer destination addresses obtained by the conversion, and generating new output gray level data corresponding to all the storage areas holding the input gray level-output gray level data in the second storing means from the foregoing steps to transfer the same to the second storing means.

In the first to seventh density processing methods according to the present invention, it is possible to reduce the capacity of the memory device for storing the input gray level-output gray level data. Moreover, the range of output gray levels is not extremely decreased and the relationship between the input gray level data and the density at which printing is actually done can be made linear, as compared with that in a method of merely adding or subtracting an offset value to or from an output gray level found by input gray level-output gray level data to obtain an output gray level corresponding to the copy density.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Description is now made of an embodiment in a case where the present invention is applied to a digital color copying machine with reference to the drawings.

Figure 1:
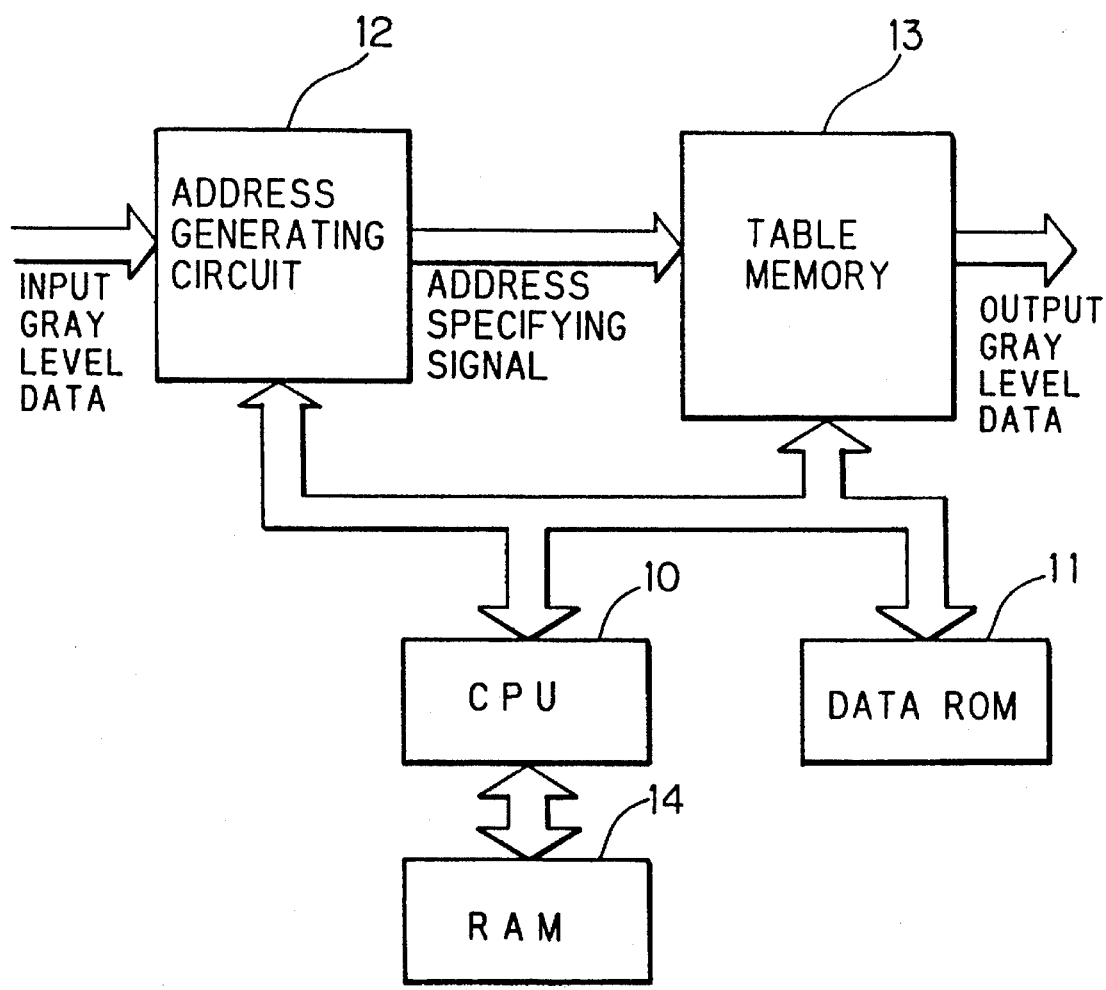
FIG. 1 is an electrical block diagram showing a density processing circuit.

FIG. 1 shows a density processing circuit in a digital color copying machine.

Figure 2:
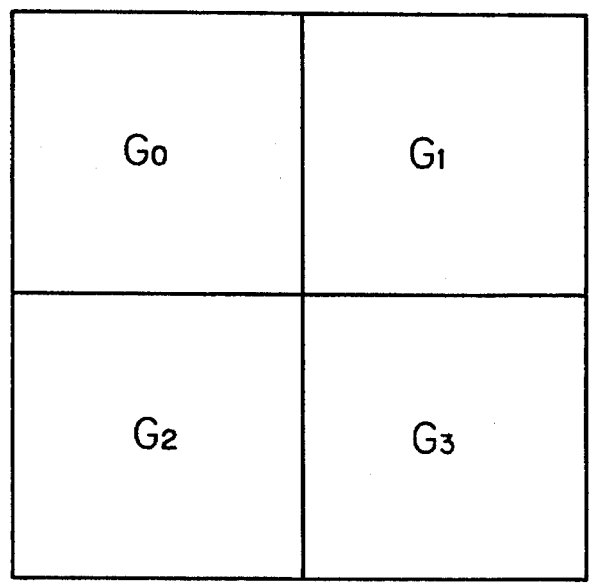
FIG. 2 is a schematic diagram showing four pixels in a dither matrix.

The density processing circuit comprises a CPU 10, a data ROM 11, a table memory 13, and an address generating circuit 12. The CPU 10 comprises a RAM 14 storing necessary data. A plurality of types of data representing a gray level of a recording pixel relative to a gray level of a reading pixel (hereinafter referred to as input gray level-output gray level data) are stored in the data ROM 11 depending on a developing color (M, C, Y or BK) and the type of document image designated in an operating section. The document images are of three types, that is, a character, a photograph, and a character-photograph mixture. The input gray level-output gray level data are previously generated using a dither matrix having as one block 2×2 pixels $G_0$, $G_1$, $G_2$ and $G_3$ shown in FIG. 2. There are 256 gray levels of the reading pixel, and there are 64 gray levels of the recording pixel.

Input gray level-output gray level data corresponding to a developing color and the type of document image out of the plurality of types of input gray level-output gray level data stored in the data ROM 11 are transferred to the table memory 13 by the CPU 10. Data representing a gray level of a reading pixel (hereinafter referred to as input gray level data) and a signal representing the position of the reading pixel (hereinafter referred to as a pixel position signal) comprising a line signal HSYNC and a dot signal CLK (not shown) are sent to the address generating circuit 12.

The address generating circuit 12 outputs a 10-bit signal for specifying an address (hereinafter referred to as an address specifying signal) expressed by binary numbers corresponding to the input gray level data and the pixel position signal (a pixel in the dither matrix which corresponds to the reading pixel). The lower eight bits of the address specifying signal correspond to the input gray levels 0 to 255, and the upper two bits thereof correspond to each of the pixels $G_0$, $G_1$, $G_2$ and $G_3$ in the dither matrix. Values expressed by the upper two bits of the address specifying signal which correspond to each of the pixels $G_0$, $G_1$, $G_2$ and $G_3$ are "00", "01", "10" and "11". When the address specifying signal is outputted from the address generating circuit 12, data stored in a specified address in the table memory 13 is outputted as data representing an output gray level (hereinafter referred to as output gray level data) from the table memory 13.

Table 1 shows one example of the input gray level-output gray level data. In Table 1, base addresses Oadr 0 to 255 denote specified addresses used as the basis corresponding to input gray level data 0 to 255, and the base addresses Oadr 0 to 255 have a one-to-one correspondence with the input gray level data 0 to 255. In addition, a total gray level indicates the total of output gray levels corresponding to the four pixels in the dither matrix relative to an input gray level.

TABLE 1

| INPUT GRAY LEVEL DATA | BASE ADDRESS (Oadr) | OUTPUT GRAY LEVEL DATA | | | | TOTAL GRAY LEVEL |
|---|---|---|---|---|---|---|
| | | $G_0$ | $G_1$ | $G_2$ | $G_3$ | |
| 0 | 0 | 0 | 0 | 0 | 0 | 0 |
| 1 | 1 | 1 | 0 | 0 | 0 | 1 |
| 2 | 2 | 2 | 0 | 0 | 0 | 2 |
| . | . | . | . | . | . | . |
| . | . | . | . | . | . | . |
| 64 | 64 | 64 | 0 | 0 | 0 | 64 |
| 65 | 65 | 64 | 1 | 0 | 0 | 65 |
| . | . | . | . | . | . | . |
| 129 | 129 | 64 | 64 | 0 | 1 | 129 |
| . | . | . | . | . | . | . |
| 255 | 255 | 64 | 64 | 63 | 64 | 255 |

Figure 3:
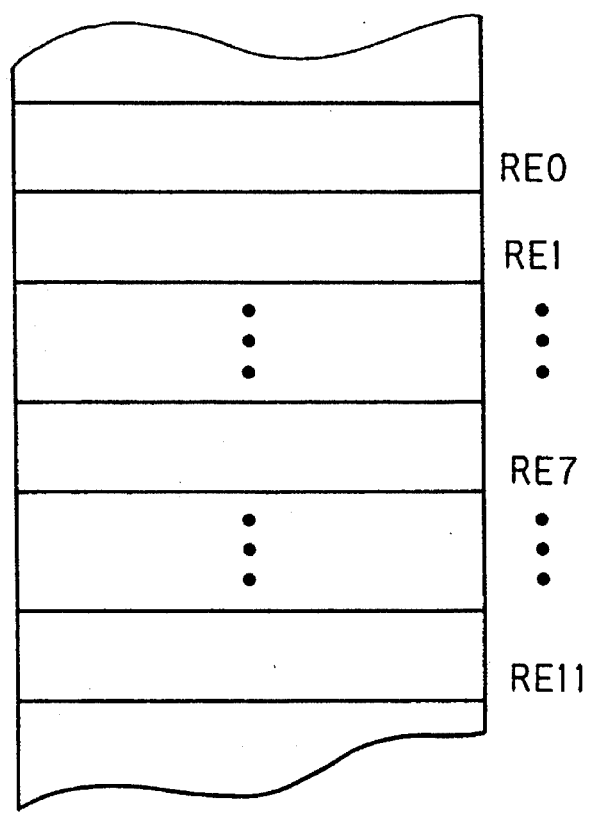
FIG. 3 is a schematic diagram showing the contents of a data ROM 11.

FIG. 3 shows the contents of the data ROM 11.

In this copying machine, input gray level-output gray level data are previously generated for four types of colors (M, C, K, and BK) and for three types of document images, that is, a character, a photograph and a character-photograph mixture designated in the operating section. Specifically, 12 types of input gray level-output data are respectively stored in areas $RE_0$ to $RE_{11}$ in the data ROM 11. In this example, the data ROM 11 is a 8-bit memory. Accordingly, the number of bytes composing each of the areas $RE_0$ to $RE_{11}$ is (the number of input gray levels)×(the number of pixels in the dither matrix), that is, 1024. Consequently, the number of bytes composing all the 12 areas is 1024×12=12288.

Figure 4:
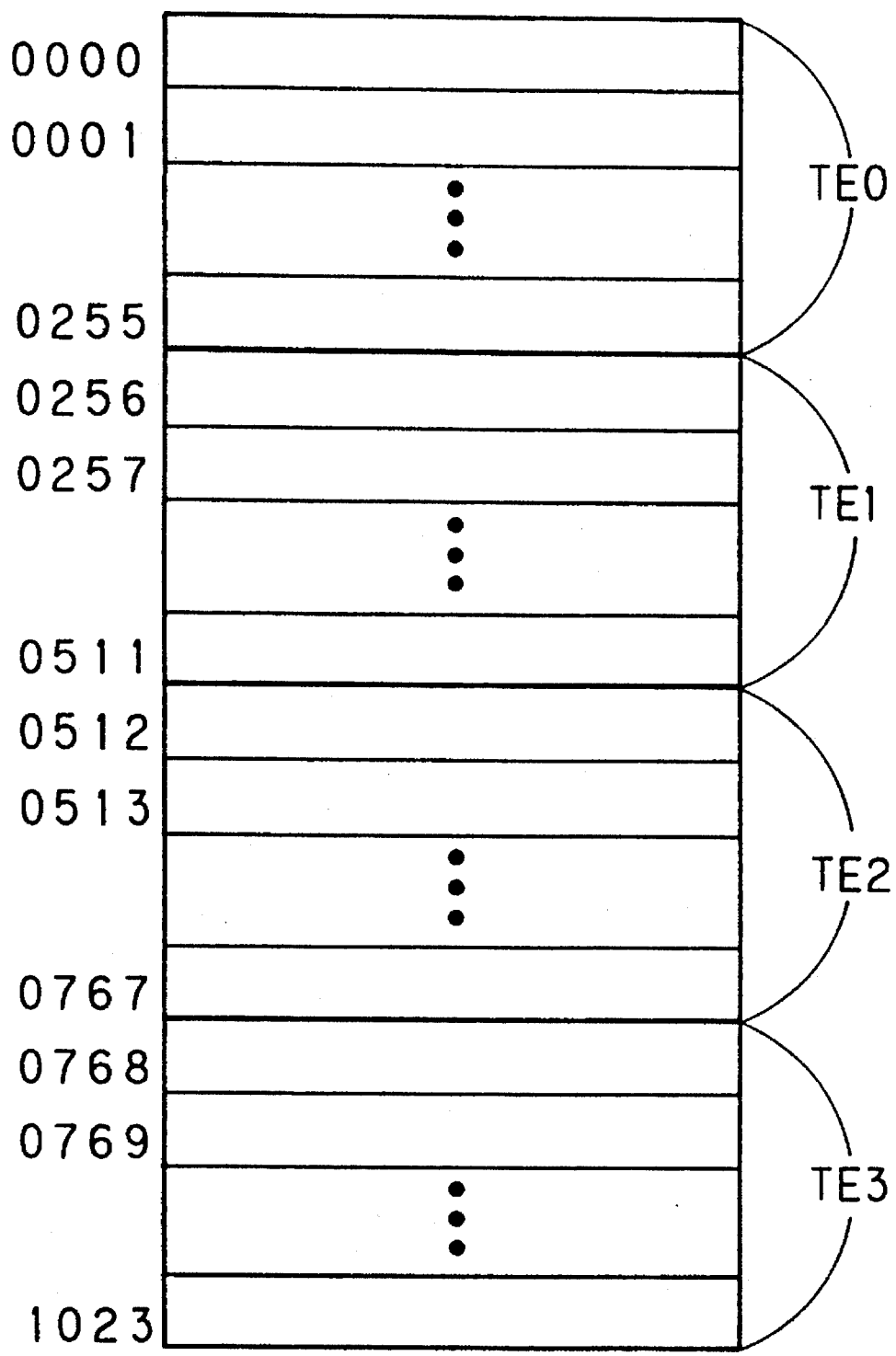
FIG. 4 is a schematic diagram showing the interior of a table memory 13.

FIG. 4 shows the interior of the table memory 13.

The table memory 13 is a 8-bit memory, and comprises an area $TE_0$ (addresses 0 to 255) for storing input gray level-output gray level data (256 gray levels) with respect to the pixel $G_0$ in the dither matrix, an area $TE_1$ (addresses 256 to 511) for storing input gray level-output gray level data with respect to the pixel $G_1$, an area $TE_2$ (addresses 512 to 767) for storing input gray level-output gray level data with respect to the pixel $G_2$, and an area $TE_3$ (addresses 768 to 1023) for storing input gray level-output gray level data with respect to the pixel $G_3$.

The density processing circuit in the copying machine outputs output gray level data corresponding to the copy density designated in the operating section on the basis of the 12 types of input gray level-output gray level data stored in the data ROM 11. There are nine methods thereof. Description is now made of the respective methods.

(I) First Method

Figure 6:
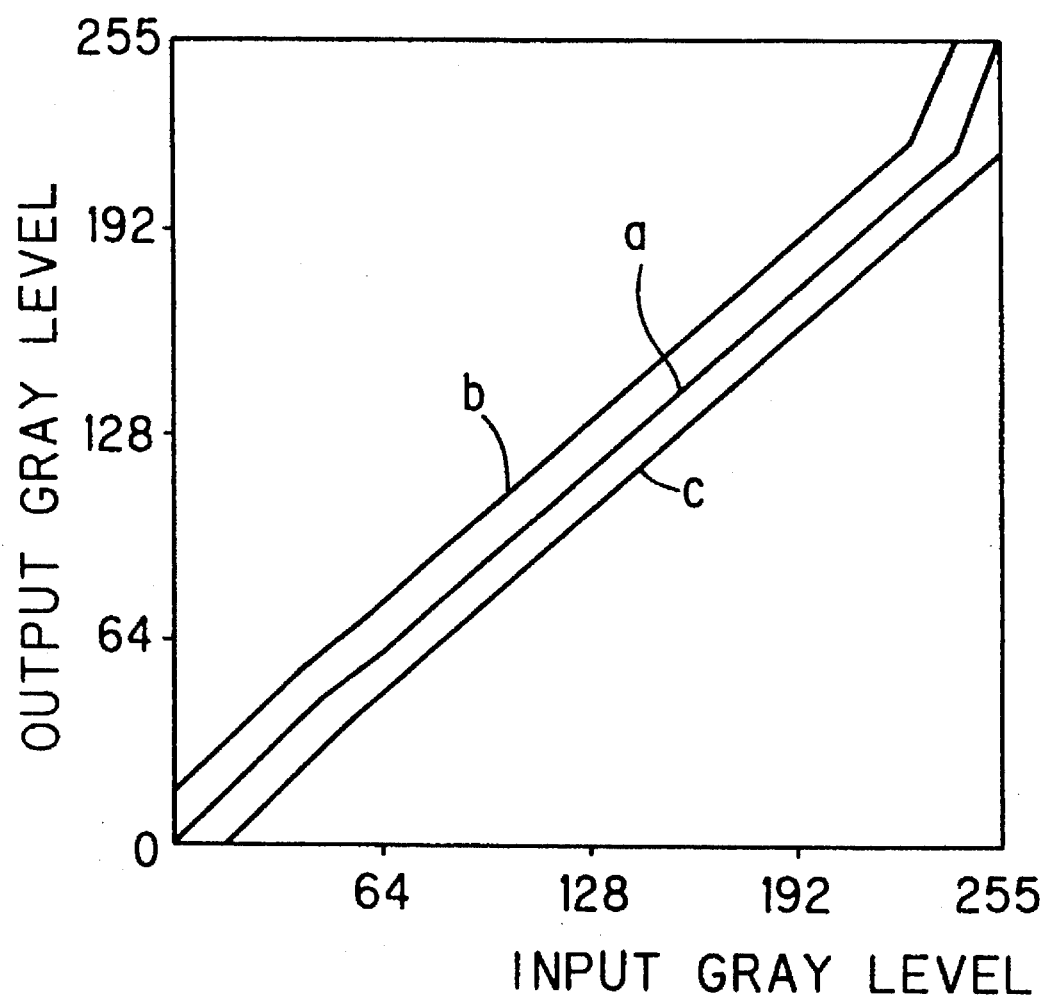
FIG. 6 is a graph showing input gray level-output gray level characteristics in a case where the first method is used.

As shown in FIG. 6, the first method is one for shifting, in a case where input gray levels are used to enter the axis of abscissa, output gray levels are used to enter the axis of ordinate, and the original input gray level-output gray level characteristics (where output gray levels denote total output gray levels) are indicated by a graph line a, the graph line a to the left or right depending on the designated copy density, to convert the original input gray level-output gray level characteristics into characteristics corresponding to the designated copy density (a graph line b or c). There are two methods used for carrying out the first method.

(I-1) First method (1)

Figure 5:
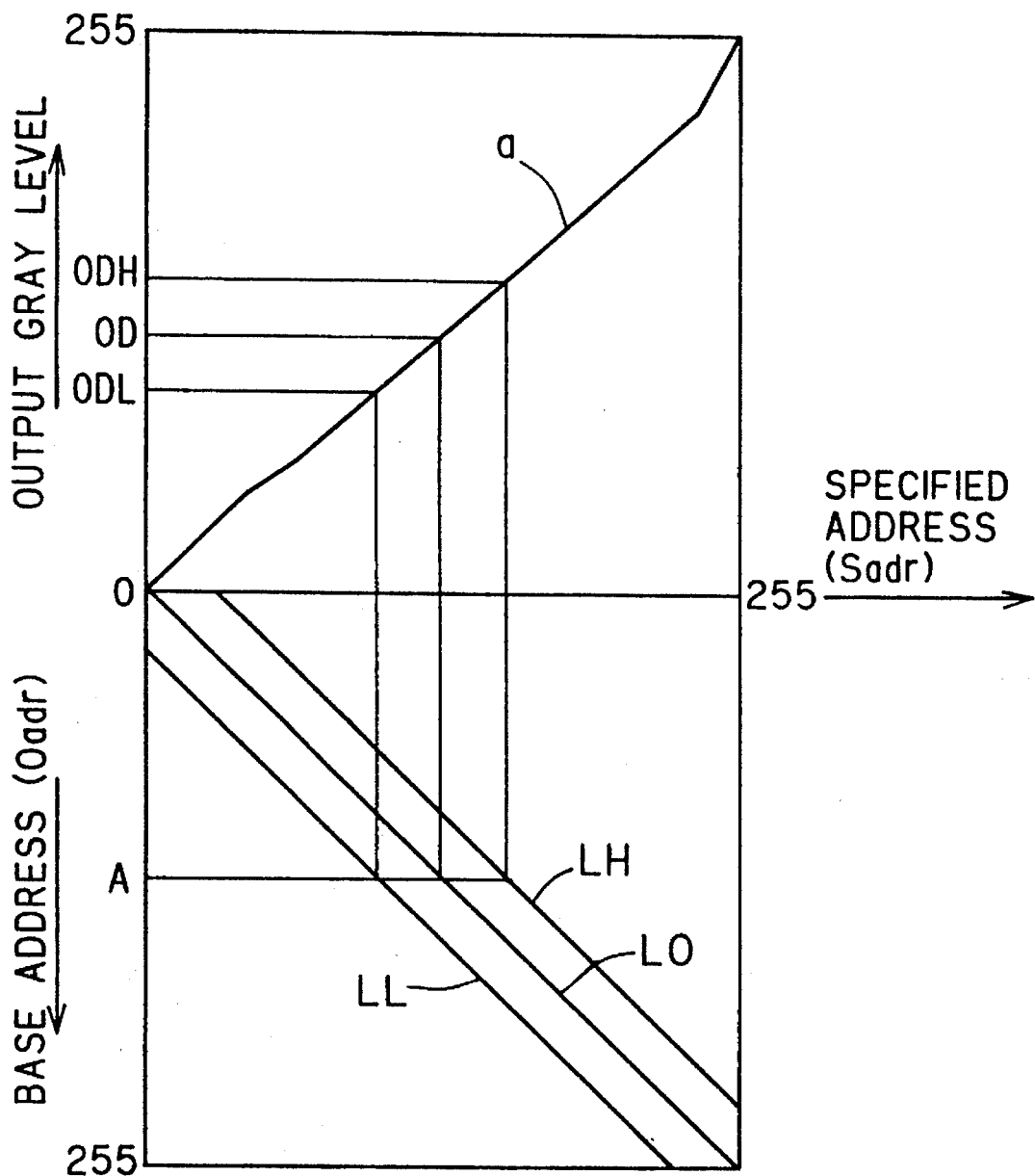
FIG. 5 is a graph for explaining a first method.

The first method (1) is one for converting specified addresses composed of eight bits corresponding to input gray level data 0 to 255 in the address generating circuit 12. Specifically, the 8-bit specified addresses used as the basis (base addresses Oadr) corresponding to the input gray level data 0 to 255 are converted. A specified address composed of upper two bits corresponding to each of the pixels $G_0$, $G_1$, $G_2$ and $G_3$ in the dither matrix is not converted. FIG. 5 shows the relationship between the base addresses Oadr (the input gray level data) 0 to 255 and 8-bit specified addresses obtained by the conversion Sadr and the relationship between the specified addresses Sadr and output gray level data (total gray level data).

The graph line a is a graph indicating the original input gray level-output gray level data in a case where input gray levels are used to enter the axis of abscissa and output gray levels are used to enter the axis of ordinate. A straight line LO is a graph indicating the relationship between the base addresses Oadr and the specified addresses Sadr in a case where a one-to-one correspondence exists between the base addresses Oadr and the specified addresses Sadr. When the designated copy density is higher than the reference copy density, the relationship between the base addresses Oadr and the specified addresses Sadr is converted into the relationship indicated by, for example, a straight line LH. On the other hand, when the designated copy density is lower than the reference copy density, the relationship between the base addresses Oadr and the specified addresses Sadr is converted into the relationship indicated by, for example, a straight line LL.

Output gray level data corresponding to Point A of the base addresses Oadr (the input gray level data) is OD when the relationship between the base addresses Oadr and the specified addresses Sadr is indicated by the straight line LO, is ODH (>OD) when the relationship between the base addresses Oadr and the specified addresses Sadr is indicated by the straight line LH, and is ODL (<OD) when the relationship between the base addresses Oadr and the specified addresses Sadr is indicated by the straight line LL.

A formula for address conversion is given by the following expression (1):

$$Sadr = Oadr + Sft \quad (1)$$

The value of Sft is changed depending on the copy density designated in the operating section, to obtain an output gray level corresponding to the designated copy density. The value of Sft corresponding to the designated copy density is previously determined, and is stored in the data ROM 11 or the other ROM (not shown). Sft is so determined, if the designated copy density is higher than the reference copy density, that it takes a positive value and that the higher the designated copy density is, the larger its absolute value is. On the other hand, Sft is so determined, if the designated copy density is lower than the reference copy density, that it takes a negative value and that the lower the designated copy density is, the larger its absolute value is.

It is assumed that one type of input gray level-output gray level data corresponding to a developing color and the type of document image out of a plurality of types of input gray level-output gray level data stored in the data ROM 11 are transferred to the table memory 13 from the data ROM 11 by the CPU 10, and the value of Sft corresponding to the designated copy density is sent to the address generating circuit 12. When input gray level data and an pixel position signal are sent to the address generating circuit 12, a specified address Sadr is found by the foregoing expression (1). Two bits corresponding to the pixel position signal are added to the specified address Sadr on the side of its most significant digit, to generate an address specifying signal. The address specifying signal is outputted from the address generating circuit 12.

However, specified addresses obtained by the conversion Sadr corresponding to input gray level data, whose values are larger than the maximum value 255 of the base addresses Oadr by the foregoing expression (1), are fixed to the maximum value 255. On the other hand, specified addresses obtained by the conversion Sadr corresponding to input gray level data, whose values are smaller than the minimum value 0 of the base addresses Oadr, are fixed to the minimum value 0. When the address specifying signal is outputted from the address generating circuit 12, data at a corresponding address in the table memory 13 is outputted as output gray level data.

For example, if the designated copy density is higher than the reference copy density and the value of Sft corresponding to the designated copy density is +15, the specified addresses Sadr corresponding to the base addresses Oadr (the input gray level data) 0 to 255 become 15 to 270 by the foregoing expression (1). The specified addresses Sadr corresponding to the input gray level data 241 to 255, whose values are larger than 255, are set to the maximum value 255 of the base addresses Oadr.

The relationship between the input gray level data and the output gray level data in a case where the value of Sft corresponding to the designated copy density is +15 is indicated by the graph line b in FIG. 6. Specifically, the graph line b is a graph line obtained by shifting the graph line a indicating the original input gray level-output gray level data by a predetermined amount to the left.

On the other hand, if the designated copy density is lower than the reference copy density and the value of Sft corresponding to the designated copy density is −15, the specified addresses Sadr corresponding to the base addresses Oadr (the input gray level data) 0 to 255 become −15 to 240 by the foregoing expression (1). The specified addresses Sadr corresponding to the input gray level data 0 to 14, whose values are smaller than 0, are set to the minimum value 0 of the base addresses Oadr.

The relationship between the input gray level data and the output gray level data in a case where the value of Sft corresponding to the designated copy density is −15 is indicated by the graph line c in FIG. 6, Specifically, the graph line c is a graph line obtained by shifting the graph line a indicating the original input gray level-output gray level data by a predetermined amount to the right.

(I-2) First method (2)

The first method (2) is one for converting transfer destination addresses in transferring input gray level-output gray level data to the table memory 13 from the data ROM 11 without converting specified addresses in the address generating circuit 12. In the first method (2), an address specifying signal used as the basis corresponding to a pixel in the dither matrix which corresponds to input gray level data and a pixel position signal is outputted from the address generating circuit 12.

The transfer of the input gray level-output gray level data from the data ROM 11 to the table memory 13 is performed in the following manner. Specifically, one type of input gray level-output gray level data corresponding to a developing color and the type of document image out of a plurality of types of input gray level-output gray level data stored in the data ROM 11 are selected. In transferring the selected input gray level-output gray level data from the data ROM 11 to the table memory 13, the transfer destination addresses are converted.

Each of the transfer destination addresses comprises two upper bits, which express values "00", "01", "10" and "11", representing each of the areas $TE_0$, $TE_1$, $TE_2$ and $TE_3$ in the table memory 13 and eight lower bits representing addresses 0 to 255 in each of the areas $TE_0$, $TE_1$, $TE_2$ and $TE_3$. A base transfer destination address OTadr composed of the lower eight bits representing the addresses 0 to 255 in each of the areas $TE_0$, $TE_1$, $TE_2$ and $TE_3$ is converted into a new transfer destination address NTadr by the following expression (2). A transfer destination address composed of the upper two bits representing each of the areas $TE_0$, $TE_1$, $TE_2$ and $TE_3$ in the table memory 13 is not converted.

$$NTadr = OTadr - Sft \quad (2)$$

In this case, the value of Sft corresponding to the designated copy density is previously determined and stored in the data ROM 11 or the other ROM. Base transfer destination addresses OTadr corresponding to respective input gray level-output gray level data in each of the areas $TE_0$, $TE_1$, $TE_2$ and $TE_3$ corresponding to the pixels $G_0$, $G_1$, $G_2$ and $G_3$ in the dither matrix are converted into new transfer destination addresses NTadr on the basis of the foregoing expression (2) from the value of Sft corresponding to the designated copy density. The respective data are transferred to the new transfer destination addresses NTadr in each of the areas $TE_0$, $TE_1$, $TE_2$ and $TE_3$ corresponding to the pixels $G_0$, $G_1$, $G_2$ and $G_3$ in the dither matrix in the table memory 13.

When the values of new transfer destination addresses NTadr are outside the range of 0 to 255, however, data corresponding to the new transfer destination addresses NTadr are not transferred. In addition, when such conversion of the transfer destination addresses is made, a blank portion where there exist no data to be transferred occurs in a portion assigned small addresses or a portion assigned large addresses in each of the areas $TE_0$, $TE_1$, $TE_2$ and $TE_3$ in the table memory 13. If the blank portion occurs in the portion assigned large addresses in each of the areas $TE_0$, $TE_1$, $TE_2$ and $TE_3$ in the table memory 13, therefore, the same data as data transferred to the largest new transfer destination address NTadr out of the new transfer destination addresses NTadr in the area is transferred to the blank portion in the area. On the other hand, if the blank portion occurs in the portion assigned small addresses in each of the areas $TE_0$, $TE_1$, $TE_2$ and $TE_3$ in the table memory 13, the same data as data transferred to the smallest new transfer destination address NTadr out of the new transfer destination addresses NTadr in the area is transferred to the blank portion in the area.

For example, if the designated copy density is higher than the reference copy density and the value of Sft corresponding to the designated copy density is +15, the base transfer destination addresses OTadr 0 to 255 are converted into new transfer designation addresses NTadr −15 to 240 by the foregoing expression (2).

Data excluding data corresponding to the new transfer destination addresses NTadr whose values are smaller than 0 are transferred to the corresponding new transfer destination addresses NTadr in the areas $TE_0$, $TE_1$, $TE_2$ and $TE_3$ in the table memory 13. In the above described example, therefore, data corresponding to the new transfer destination addresses NTadr 0 to 240 are transferred to the corresponding new transfer destination addresses in the areas $TE_0$, $TE_1$, $TE_2$ and $TE_3$ in the table memory 13. Data corresponding to the new transfer destination addresses NTadr −15 to −1 are not transferred.

Furthermore, when such transfer is performed, the blank portion occurs in the portion assigned large addresses in each of the areas $TE_0$, $TE_1$, $TE_2$ and $TE_3$ in the table memory 13. Accordingly, the same data as data transferred to the largest new transfer destination address NTadr (240 in the above described example) out of the new transfer destination addresses NTadr in the area is transferred to the blank portion in the area. If an address specifying signal is outputted from the address generating circuit 12 after the transfer is performed, data corresponding to an address specified is outputted from the table memory 13. The relationship between the input gray level data and the output gray level data in a case where the value of Sft corresponding to the designated copy density is +15 is indicated by the graph line b in FIG. 6.

On the other hand, if the designated copy density is lower than the reference copy density and the value of Sft corresponding to the designated copy density is −15, the base transfer destination addresses OTadr 0 to 255 corresponding to the respective data are converted into new transfer destination addresses NTadr 15 to 270 by the foregoing expression (2).

Data excluding data corresponding to the new transfer destination addresses NTadr whose values are larger than 255 are transferred to the corresponding new transfer destination addresses NTadr in the areas $TE_0$, $TE_1$, $TE_2$ and $TE_3$ in the table memory 13. In the above described example, therefore, data corresponding to the new transfer destination addresses NTadr 15 to 255 are transferred to the corresponding new transfer destination addresses in the areas $TE_0$, $TE_1$, $TE_2$ and $TE_3$ in the table memory 13. Data corresponding to the new transfer destination addresses NTadr 256 to 270 are not transferred.

Furthermore, when such transfer is performed, the blank portion occurs in the portion assigned small addresses in each of the areas $TE_0$, $TE_1$, $TE_2$ and $TE_3$ in the table memory 13. Accordingly, the same data as data transferred to the smallest new transfer destination address NTadr (15 in the above described example) out of the new transfer destination addresses NTadr in the area is transferred to the blank portion in the area. If an address specifying signal is outputted from the address generating circuit 12 after the transfer is performed, data corresponding to an address specified is outputted from the table memory 13. The relationship between the input gray level data and the output gray level data in a case where the value of Sft corresponding to the designated copy density is −15 is indicated by the graph line c in FIG. 6.

If the input gray level-output gray level characteristics obtained by the above described first method which are indicated by the graph lines b or c in FIG. 6 are compared with the original input gray level-output gray level characteristics which are indicated by the graph line a in FIG. 6, the value of an output gray level at a point on the characteristic curve b or c is unchanged from the value of an output gray level at a corresponding point on the characteristic curve a. Accordingly, the relationship between the output gray level data and the density at which printing is actually done in the original input gray level-output gray level characteristics can be maintained. Therefore, the relationship between the input gray level data and the density at which printing is actually done can be made linear. In addition, the range of output gray levels is not extremely decreased, as compared with that in a method of merely adding or subtracting an offset value to or from an output gray level found by the original input gray level-output gray level data.

(II) Second Method

Figure 8:
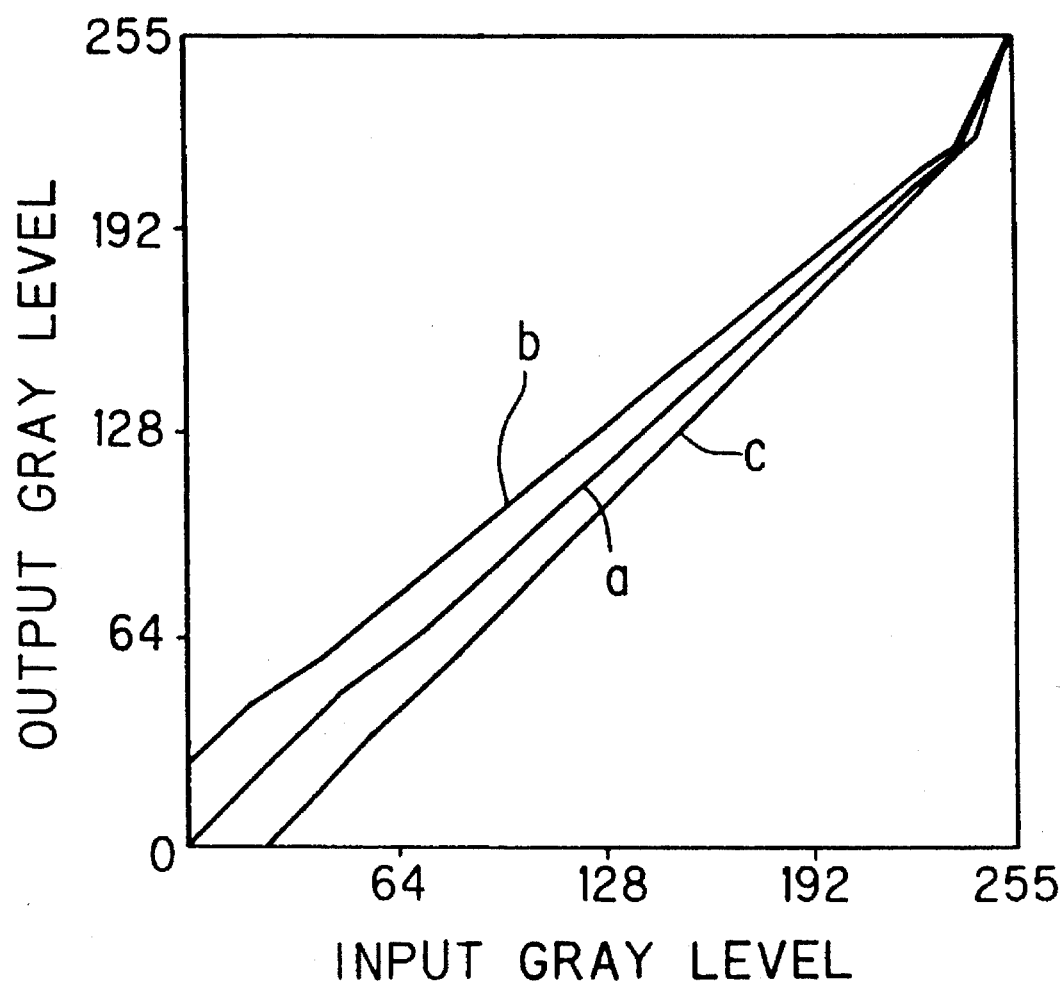
FIG. 8 is a graph showing input gray level-output gray level characteristics in a case where the second method is used.

As shown in FIG. 8, the second method is one for rotating, in a case where input gray levels are used to enter the axis of abscissa, output gray levels are used to enter the axis of ordinate, and the original input gray level-output gray level characteristics are indicated by a graph line a, the graph line a through a predetermined angle in a clockwise direction or in a counterclockwise direction around a point, which corresponds to the input gray level 255, on the graph line a depending on the designated copy density, to convert the original input gray level-output gray level characteristics into characteristics corresponding to the designated copy density (a graph line b or c). There are two methods used for carrying out the second method.

(II-1) Second Method (1)

Figure 7:
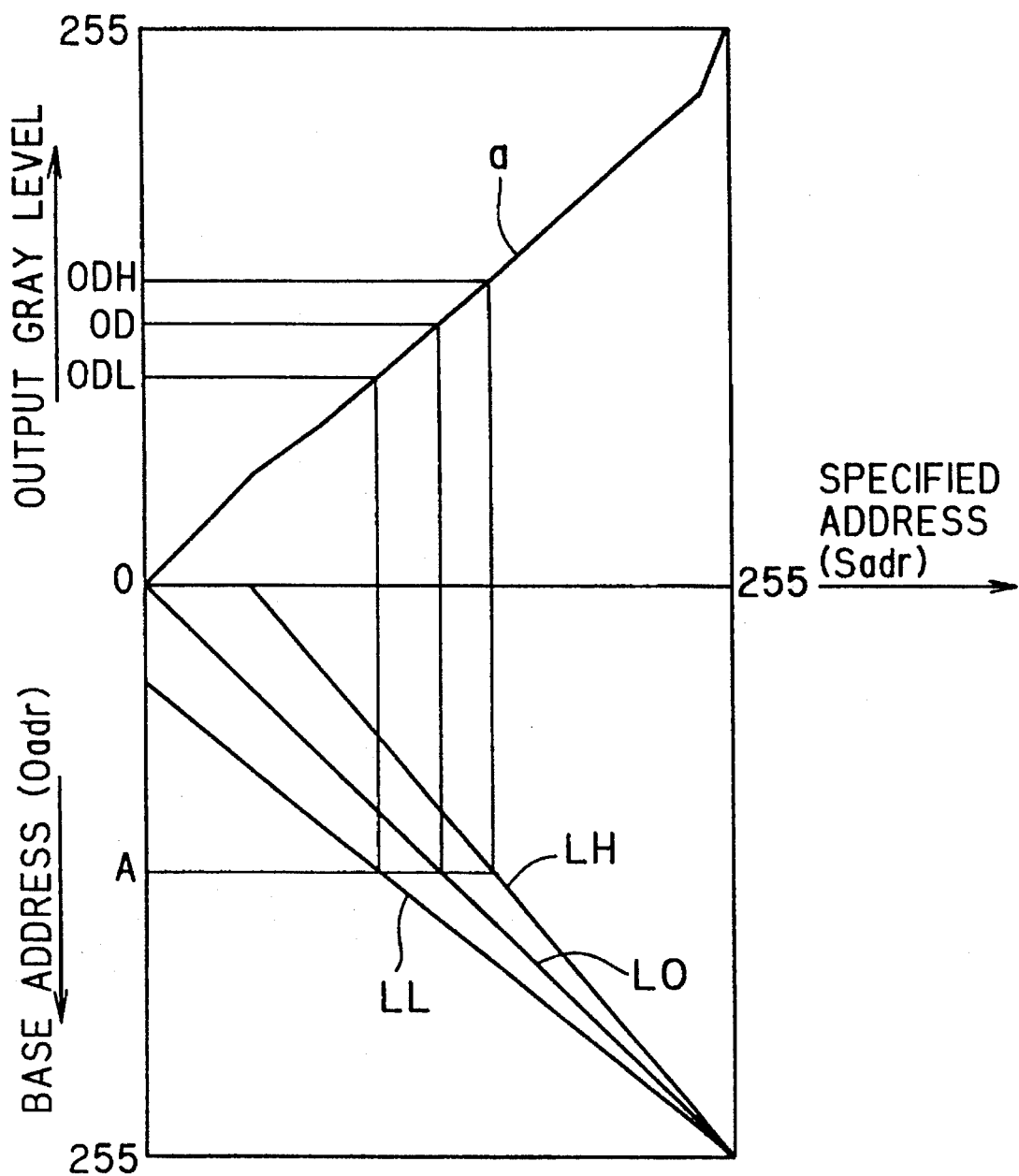
FIG. 7 is a graph for explaining a second method.

The second method (1) is one for converting specified addresses composed of eight bits (base addresses Oadr) corresponding to input gray level data 0 to 255 in the address generating circuit 12. A specified address composed of two upper bits corresponding to each of the pixels $G_0$, $G_1$, $G_2$ and $G_3$ in the dither matrix is not converted. FIG. 7 shows the relationship between the base addresses Oadr 0 to 255 and specified addresses obtained by the conversion Sadr and the relationship between the specified addresses Sadr and output gray level data (total gray level data).

The graph line a is a graph indicating the original input gray level-output gray level data in a case where input gray levels are used to enter the axis of abscissa and output gray levels are used to enter the axis of ordinate. A straight line LO is a graph indicating the relationship between the base addresses Oadr and the specified addresses Sadr in a case where a one-to-one correspondence exists between the base addresses Oadr and the specified addresses Sadr. When the designated copy density is higher than the reference copy density, the relationship between the base addresses Oadr and the specified addresses Sadr is converted into the relationship indicated by a straight line LH. On the other hand, when the designated copy density is lower than the reference copy density, the relationship between the base addresses Oadr and the specified addresses Sadr is converted into the relationship indicated by a straight line LL.

Output gray level data corresponding to Point A of the base addresses Oadr (the input gray level data) is OD when the relationship between the base addresses Oadr and the specified addresses Sadr is indicated by the straight line LO, is ODH (>OD) when the relationship between the base addresses Oadr and the specified addresses Sadr is indicated by the straight line LH, and is ODL (<OD) when the relationship between the base addresses Oadr and the specified addresses Sadr is indicated by the straight line LL.

A formula for address conversion is given by the following expression (3):

$$Sadr=255-\{Gain\ (255-Oadr)+Offset\} \quad (3)$$

In the foregoing expression (3), the slope of the straight line LO (Sadr/Oadr) can be adjusted by adjusting the value of Gain. In this case, the slope of the straight line LO is adjusted around a point, which corresponds to the input gray level 255, on the straight line LO, so that the value of Offset is always 0.

The value of Gain is changed depending on the copy density designated in the operating section, to obtain an output gray level corresponding to the designated copy density. The value of Gain corresponding to the designated copy density is previously determined, and is stored in the data ROM 11 or the other ROM (not shown). Gain is so determined, if the designated copy density is higher than the reference copy density, that it takes a value smaller than 1 and that the higher the designated copy density is, the smaller the value is. On the other hand, Gain is so determined, if the designated copy density is lower than the reference copy density, that it takes a value larger than 1 and that the lower the designated copy density is, the larger the value is.

It is assumed that one type of input gray level-output gray level data corresponding to a developing color and the type of document image out of a plurality of types of input gray level-output gray level data stored in the data ROM 11 are transferred to the table memory 13 from the data ROM 11 by the CPU 10, and the value of Gain corresponding to the designated copy density is sent to the address generating circuit 12 by the CPU 10. When input gray level data and a pixel position signal are sent to the address generating circuit 12, a specified address Sadr is found by the foregoing expression (3). Two bits corresponding to the pixel position signal are added to the specified address Sadr on the side of its most significant digit, to generate an address specifying signal. The address specifying signal is outputted from the address generating circuit 12.

However, specified addresses obtained by the conversion Sadr corresponding to input gray level data, whose values are smaller than the minimum value 0 of the base addresses Oadr by the foregoing expression (3), are fixed to the minimum value 0. When the address specifying signal is outputted from the address generating circuit 12, data at a corresponding address in the table memory 13 is outputted as output gray level data.

For example, if the designated copy density is higher than the reference copy density and the value of Gain corresponding to the designated copy density is 0.9, the relationship between the input gray level data and the output gray level data is indicated by the graph line b in FIG. 8. Specifically, the graph line b is a graph line obtained by rotating the graph line a indicating the original input gray level-output gray level data stored in the data ROM 11 through a predetermined angle in a clockwise direction around a point, which corresponds to the input gray level 255, on the graph line a. On the other hand, if the designated copy density is lower than the reference copy density and the value of Gain corresponding to the designated copy density is 1.1, the relationship between the input gray level data and the output gray level data is indicated by the graph line c in FIG. 8. Specifically, the graph line c is a graph line obtained by rotating the graph line a indicating the original input gray level-output gray level data stored in the data ROM 11 through a predetermined angle in a counterclockwise direction around a point, which corresponds to the input gray level 255, on the graph line a.

(II-2) Second Method (2)

The second method (2) is one for converting transfer destination addresses in transferring input gray level-output gray level data to the table memory 13 from the data ROM 11 without converting specified addresses in the address generating circuit 12. In this second method (2), an address specifying signal used as the basis corresponding to a pixel in the dither matrix which corresponds to input gray level data and a pixel position signal is outputted from the address generating circuit 12.

The transfer of the input gray level-output gray level data from the data ROM 11 to the table memory 13 is performed in the following manner. Specifically, one type of input gray level-output gray level data corresponding to a developing color and the type of document image out of a plurality of types of input gray level-output gray level data stored in the data ROM 11 are selected. In transferring the selected input gray level-output gray level data from the data ROM 11 to the table memory 13, the transfer destination addresses are converted.

Each of the transfer destination address comprises two upper bits, which express values "00", "01", "10" and "11", representing each of the areas $TE_0$, $TE_1$, $TE_2$ and $TE_3$ in the table memory 13 and eight lower bits representing addresses 0 to 255 in each of the areas $TE_0$, $TE_1$, $TE_2$ and $TE_3$. A base transfer destination address OTadr composed of the lower eight bits representing the addresses 0 to 255 in each of the areas $TE_0$, $TE_1$, $TE_2$ and $TE_3$ is converted into a new transfer destination address NTadr by the following expression (4). A transfer destination address composed of the upper two bits representing each of the areas $TE_0$, $TE_1$, $TE_2$ and $TE_3$ in the table memory 13 is not converted.

$$NTadr=\{OTadr+255\ (Gain-1)+Offset\} \div Gain \quad (4)$$

The value of Offset is 0. Also in this case, the value of Gain corresponding to the designated copy density is previously determined and stored in the data ROM 11 or the other ROM. Base transfer destination addresses OTadr corresponding to respective input gray level-output gray level data in each of the areas $TE_0$, $TE_1$, $TE_2$ and $TE_3$ corresponding to the pixels $G_0$, $G_1$, $G_2$ and $G_3$ in the dither matrix are converted into new transfer destination addresses NTadr on the basis of the foregoing expression (4) from the value of Gain corresponding to the designated copy density. The respective data are transferred to the new transfer destination addresses NTadr in each of the areas $TE_0$, $TE_1$, $TE_2$ and $TE_3$ corresponding to the pixels $G_0$, $G_1$, $G_2$ and $G_3$ in the dither matrix in the table memory 13.

The values of new transfer destination addresses NTadr may, in some cases, be smaller than 0. However, data corresponding to the new transfer destination addresses NTadr are not transferred. In addition, when such conversion of the transfer destination addresses is made, a blank portion where there exist no data to be transferred may, in some cases, occur in a portion assigned small addresses in each of the areas $TE_0$, $TE_1$, $TE_2$ and $TE_3$ in the table memory 13. If the blank portion occurs in the portion assigned small addresses in each of the areas $TE_0$, $TE_1$, $TE_2$ and $TE_3$ in the table memory 13, therefore, the same data as data transferred to the smallest new transfer destination address NTadr out of the new transfer destination addresses NTadr in the area is transferred to the blank portion in the area.

If an address specifying signal is outputted from the address generating circuit 12 after the transfer is performed, data corresponding to an address specified is outputted from the table memory 13. The relationship between the input gray level data and the output gray level data in a case where the value of Gain corresponding to the designated copy density is 0.9 is indicated by the graph line b in FIG. 8. The relationship between the input gray level data and the output gray level data in a case where the value of Gain corresponding to the designated copy density is 1.1 is indicated by the graph line c in FIG. 8.

If the input gray level-output gray level characteristics obtained by the above described second method are compared with the original input gray level-output gray level characteristics, the value of an output level at a point on the characteristic curve is slightly changed from the value of an output gray level at a corresponding point on the original characteristic curve in a low density portion. However, the range of input gray levels which can be reproduced is not decreased, as compared with that in the first method.

(III) Third Method

Figure 10:
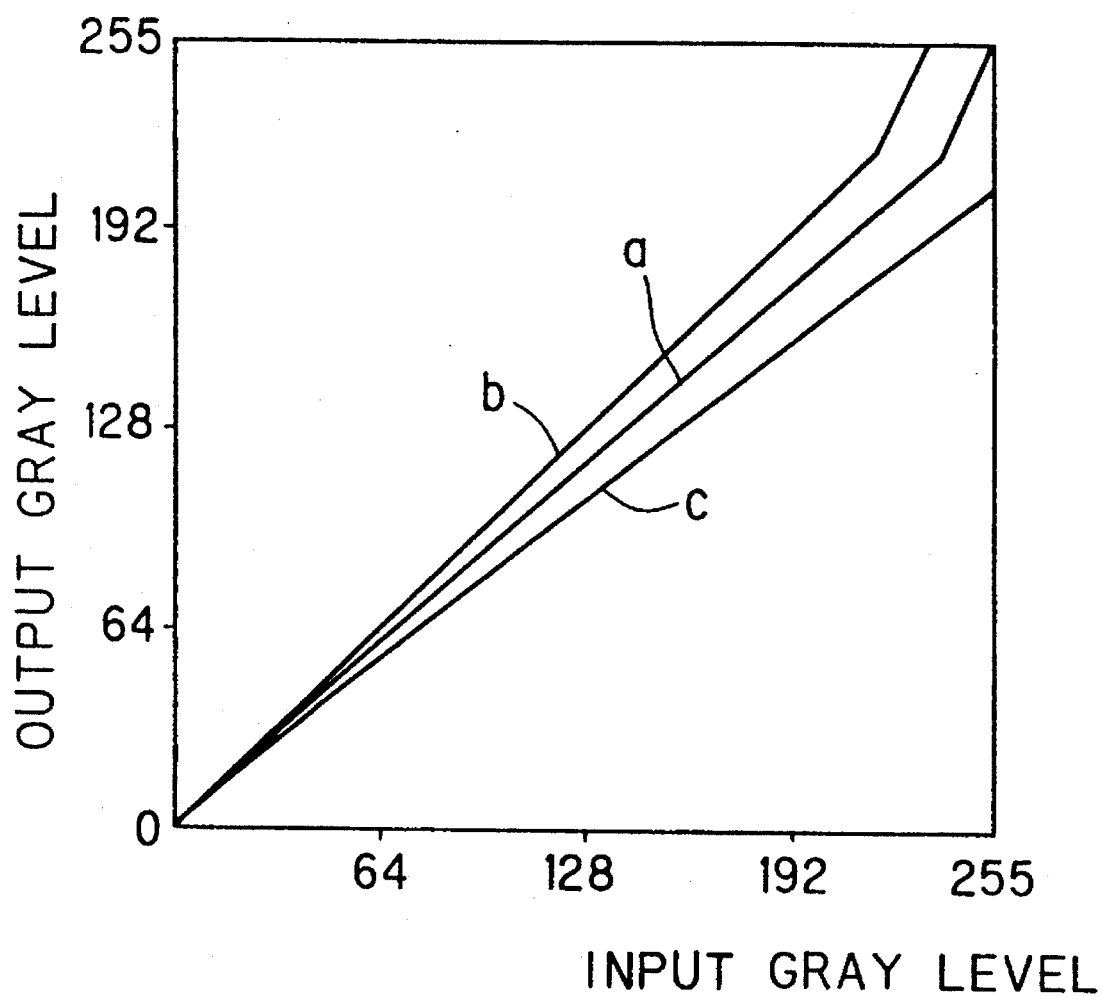
FIG. 10 is a graph showing input gray level-output gray level characteristics in a case where the third method is used.

As shown in FIG. 10, the third method is one for so rotating, in a case where input gray levels are used to enter the axis of abscissa, output gray levels are used to enter the axis of ordinate, and the original input gray level-output gray level characteristics are indicated by a graph line a, the graph line a through a predetermined angle in a clockwise direction or in a counterclockwise direction around a point, which corresponds to the input gray level 0, on the graph line a depending on the designated copy density, to convert the original input gray level-output gray level characteristics into characteristics corresponding to the designated copy density (a graph line b or c). There are two methods used for carrying out the third method.

(III-1) Third Method (1)

Figure 9:
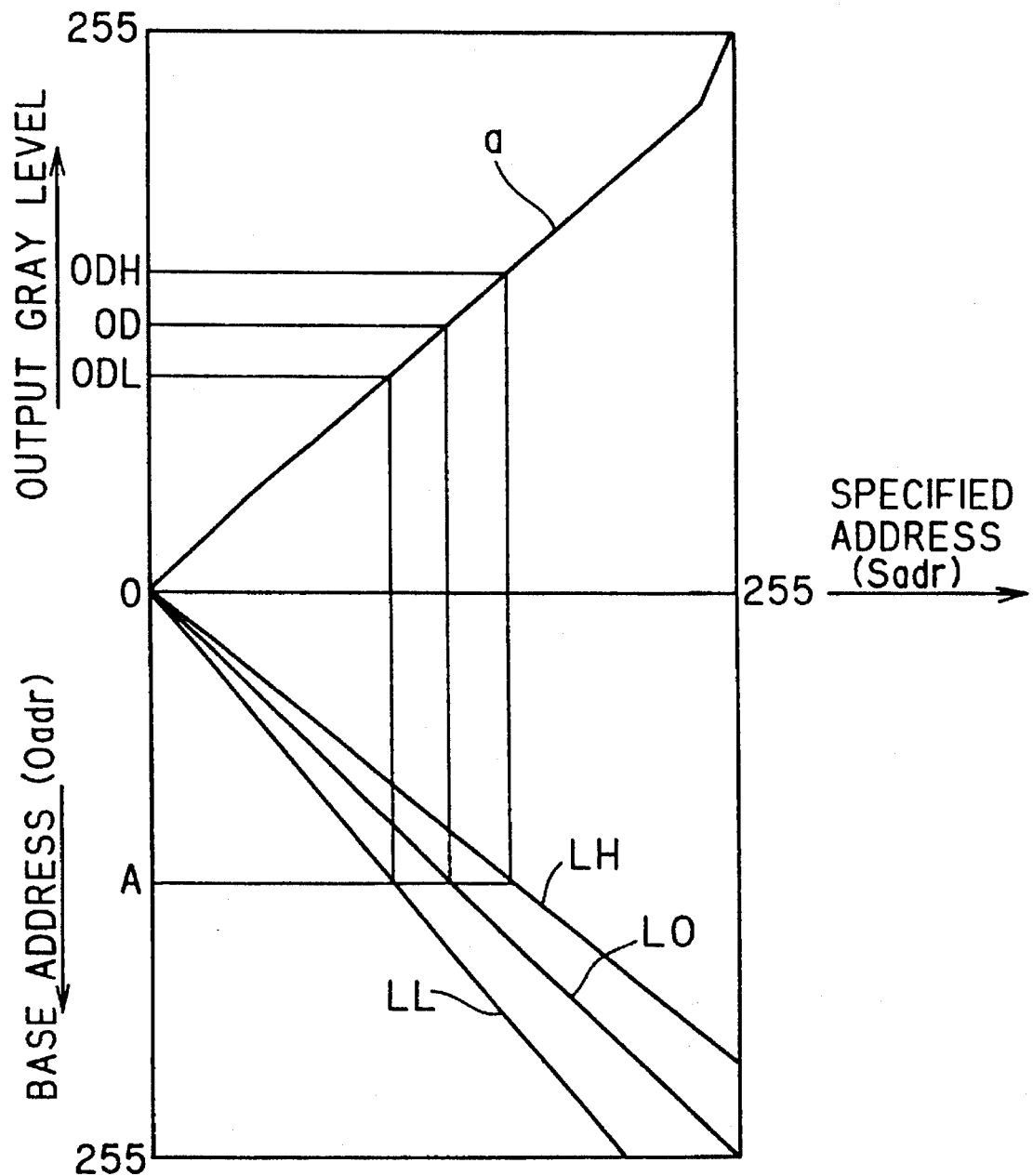
FIG. 9 is a graph for explaining a third method.

The third method (1) is one for converting specified addresses composed of eight bits (base addresses Oadr) corresponding to input gray level data 0 to 255 in the address generating circuit 12. A specified address composed of two upper bits corresponding to each of the pixels $G_0$, $G_1$, $G_2$ and $G_3$ in the dither matrix is not converted. FIG. 9 shows the relationship between the base addresses Oadr 0 to 255 and specified addresses obtained by the conversion Sadr and the relationship between the specified addresses Sadr and output gray level data (total gray level data).

The graph line a is a graph indicating the original input gray level-output gray level data in a case where input gray levels are used to enter the axis of abscissa and output gray levels are used to enter the axis of ordinate. A straight line LO is a graph indicating the relationship between the base addresses Oadr and the specified addresses Sadr in a case where a one-to-one correspondence exists between the base addresses Oadr and the specified addresses Sadr. When the designated copy density is higher than the reference copy density, the relationship between the base addresses Oadr and the specified addresses Sadr is converted into the relationship indicated by a straight line LH. On the other hand, when the designated copy density is lower than the reference copy density, the relationship between the base addresses Oadr and the specified addresses Sadr is converted into the relationship indicated by a straight line LL.

Output gray level data corresponding to Point A of the base addresses Oadr (the input gray level data) is OD when the relationship between the base addresses Oadr and the specified addresses Sadr is indicated by the straight line LO, is ODH (>OD) when the relationship between the base addresses Oadr and the specified addresses Sadr is indicated by the straight line LH, and is ODL (<OD) when the relationship between the base addresses Oadr and the specified addresses Sadr is indicated by the straight line LL.

A formula for address conversion is given by the following expression (5):

$$Sadr=255-\{Gain\ (255-Oadr)+Offset\} \quad (5)$$

In the foregoing expression (5), the slope of the straight line LO (Sadr/Oadr) can be adjusted by adjusting the value of Gain. In this case, the slope of the straight line LO is adjusted around a point, which corresponds to the input gray level 0, on the straight line LO, so that the value of Offset is so adjusted that the value of {255.Gain +Offset] is 255.

The values of Gain and Offset are changed depending on the copy density designated in the operating section, to obtain an output gray level corresponding to the designated copy density. The values of Gain and Offset corresponding to the designated copy density are previously determined, and are stored in the data ROM 11 or the other ROM (not shown). Gain is so determined, if the designated copy density is higher than the reference copy density, that it takes a value larger than 1 and that the higher the designated Copy density is the larger the value is. On the other hand. Gain is so determined, if the designated copy density is lower than the reference copy density, that it takes a value smaller than 1 and that the lower the designated copy density is, the smaller the value is.

It is assumed that one type of input gray level-output gray level data corresponding to a developing color and the type of document image out of a plurality of types of input gray level-output gray level data stored in the data ROM 11 are transferred to the table memory 13 from the data ROM 11 by the CPU 10, and the values of Gain and Offset corresponding to the designated copy density are sent to the address generating circuit 12 by the CPU 10. When input gray level data and a pixel position signal are sent to the address generating circuit 12, a specified address Sadr is found by the foregoing expression (5). Two bits corresponding to the pixel position signal are added to the specified address Sadr on the side of its most significant digit, to generate an address specifying signal. The address specifying signal is outputted from the address generating circuit 12.

However, specified addresses Sadr corresponding to input gray level data, whose values are larger than the maximum value 255 of the base addresses Oadr by the foregoing expression (5), are fixed to the maximum value 255. When the address specifying signal is outputted from the address generating circuit 12, data at a corresponding address in the table memory 13 is outputted as output gray level data.

For example, if the designated copy density is higher than the reference copy density and the values of Gain and Offset corresponding to the designated copy density are respectively 1.1 and −25.5, the relationship between the input gray level data and the output gray level data is indicated by the graph line b in FIG. 10. Specifically, the graph line b is a graph line obtained by rotating the graph line a indicating the original input gray level-output gray level data stored in the data ROM 11 through a predetermined angle in a counter-clockwise direction around a point, which corresponds to the input gray level 0, on the graph line a. On the other hand, if the designated copy density is lower than the reference copy density and the values of Gain and Offset corresponding to the designated copy density are respectively 0.9 and +25.5, the relationship between the input gray level data and the output gray level data is indicated by the graph line c in FIG. 10. Specifically, the graph line c is a graph line obtained by rotating the graph line a indicating the original input gray level-output gray level data stored in the data ROM 11 through a predetermined angle in a clockwise direction around a point, which corresponds to the input gray level 255, on the graph line a.

(III-2) Third Method (2)

The third method (2) is one for converting transfer destination addresses in transferring input gray level-output gray level data to the table memory 13 from the data ROM 11 without converting specified addresses in the address generating circuit 12. In this third method (2), an address specifying signal used as the basis corresponding to a pixel in the dither matrix which corresponds to input gray level data and a pixel position signal is outputted from the address generating circuit 12.

The transfer of the input gray level-output gray level data from the data ROM 11 to the table memory 13 is performed in the following manner. Specifically, one type of input gray level-output gray level data corresponding to a developing color and the type of document image out of a plurality of types of input gray level-output gray level data stored in the data ROM 11 are selected. In transferring the selected input gray level-output gray level data from the data ROM 11 to the table memory 13, the transfer destination addresses are converted.

Each of the transfer destination addresses comprises two upper bits, which express values "00", "01", "10" and "11", representing each of the areas $TE_0$, $TE_1$, $TE_2$ and $TE_3$ in the table memory 13 and eight lower bits representing addresses 0 to 255 in each of the areas $TE_0$, $TE_1$, $TE_2$ and $TE_3$. A base transfer destination address OTadr composed of the lower eight bits representing the addresses 0 to 255 in each of the areas $TE_0$, $TE_1$, $TE_2$ and $TE_3$ is converted into a new transfer destination address NTadr by the following expression (6). A transfer destination address composed of the upper two bits representing each of the areas $TE_0$, $TE_1$, $TE_2$ and $TE_3$ in the table memory 13 is not converted.

$$NTadr=\{OTadr+255(Gain-1)+Offset\} \div Gain \qquad (6)$$

Also in this case, the values of Gain and Offset corresponding to the designated copy density are previously determined and stored in the data ROM 11 or the other ROM. Base transfer destination addresses OTadr corresponding to respective input gray level-output gray level data in each of the areas $TE_0$, $TE_1$, $TE_2$ and $TE_3$ corresponding to the pixels $G_0$, $G_1$, $G_2$ and $G_3$ in the dither matrix are converted into new transfer destination addresses NTadr on the basis of the foregoing expression (6) from the value of Sft corresponding to the designated copy density. The respective data are transferred to the new transfer destination addresses NTadr in each of the areas $TE_0$, $TE_1$, $TE_2$ and $TE_3$ corresponding to the pixels $G_0$, in $G_1$, $G_2$ and $G_3$ in the dither matrix in the table memory 13.

When the values of new transfer destination addresses NTadr are larger than 255, however, data corresponding to the new transfer destination address NTadr are not transferred. In addition, when such conversion of the transfer destination addresses is made, a blank portion may, in some cases, occur in a portion assigned large addresses in each of the areas $TE_0$, $TE_1$, $TE_2$ and $TE_3$ in the table memory 13. If the blank portion occurs in the portion assigned large addresses in each of the areas $TE_0$, $TE_1$, $TE_2$ and $TE_3$ in the table memory 13, therefore, the same data as data transferred to the largest new transfer destination address NTadr out of the new transfer destination addresses NTadr in the area is transferred to the blank portion in the area.

If an address specifying signal is outputted from the address generating circuit 12 after the transfer is performed, data corresponding to an address specified is outputted from the table memory 13. The relationship between the input gray level data and the output gray level data in a case where the values of Gain and Offset corresponding to the designated copy density are respectively 1.1 and −25.5 is indicated by the graph line b in FIG. 10. The relationship between the input gray level data and the output gray level data in a case where the values of Gain and Offset corresponding to the designated copy density are respectively 0.9 and +25.5 is indicated by the graph line c in FIG. 10.

If the input gray level-output gray level characteristics obtained by the above described third method are compared with the original input gray level-output gray level characteristics, the value of an output gray level at a point on the characteristic curve is slightly changed from the value of an output gray level at a corresponding point on the original characteristic curve in a high density portion. However, the range of input gray levels which can be reproduced is not decreased, as compared with that in the first method.

In the third method, the expression (5) may be replaced with the following expression (7), and the expression (6) may be replaced with the following expression (8):

$$Aadr=Gain \times Oadr \qquad (7)$$

$$NTadr=(1/Gain) \times OTadr \qquad (8)$$

(IV) Fourth Method

The fourth method is a method using the above described second method when the copy density designated in the operating section is higher than the reference copy density and using the above described third method when the copy density designated in the operating section is lower than the reference copy density.

Specifically, when the designated copy density is higher than the reference copy density, the second method is so used, in a case where the original input gray level-output gray level characteristics are indicated by the graph line a in FIG. 8, that the original input gray level-output gray level characteristics are converted into characteristics (the graph line b) obtained by rotating the graph line a through a predetermined angle in a clockwise direction around a point, which corresponds to the input gray level 255, on the graph line a in conformity with the designated copy density. On the other hand, when the designated copy density is lower than the reference copy density, the third method is so used, in a case where the original input gray level-output gray level characteristics are indicated by the graph line a in FIG. 10, that the original input gray level-output gray level characteristics are converted into characteristics (the graph line c) obtained by rotating the graph line a through a predetermined angle in a clockwise direction around a point, which corresponds to the input gray level 0, on the graph line a in conformity with the designated copy density.

There are two methods used for carrying out the fourth method, that is, a method of converting specified addresses in the address generating circuit 12 and a method of converting transfer destination addresses in transferring input gray level-output gray level data to the table memory 13 from the data ROM 11 without converting specified addresses in the address generating circuit 12.

In the method of converting the specified addresses in the address generating circuit 12, the specified addresses are so converted that output gray levels are higher in the above described second method (1) when the designated copy density is higher than the reference copy density, while being so converted that output gray levels are lower in the above described third method (2) when the designated copy density is lower than the reference copy density. In this case, as a formula for converting the specified address, the expression (3) common to the second and third methods is used.

In the method of converting the transfer destination addresses in transferring input gray level-output gray level data from the data ROM 11 to the table memory 13, the transfer destination addresses are so converted that output gray levels are higher in the above described second method (2) when the designated copy density is higher than the reference copy density, while being so converted that output gray levels are lower in the above described third method (2) when the designated copy density is lower than the reference copy density. In this case, as a formula for converting transfer destination addresses, the expression (4) common to the second and third methods is used.

The fourth method has the advantage that the change of a document image corresponding to the designated copy density is easily recognized by a viewer because a low density portion of the document image is made particularly dark in the recorded image when the designated copy density is higher than the reference copy density, while a high density portion of the document image is made particularly light in the recorded image when the designated copy density is lower than the reference copy density.

A table memory having a capacity capable of storing four types of input gray level-output gray level data corresponding to four developing colors may be used as the table memory 13, and the input gray level-output gray level data corresponding to the four developing colors which correspond to the type of the document image out of a plurality of types of input gray level-output gray level data stored in the data ROM 11 may be transferred. In this case, a signal representing a developing color is sent to the address generating circuit 12 from the CPU 10, so that a 12-bit address specifying signal including the signal representing a developing color is outputted from the address generating circuit 12.

(V) Fifth Method

Figure 12:
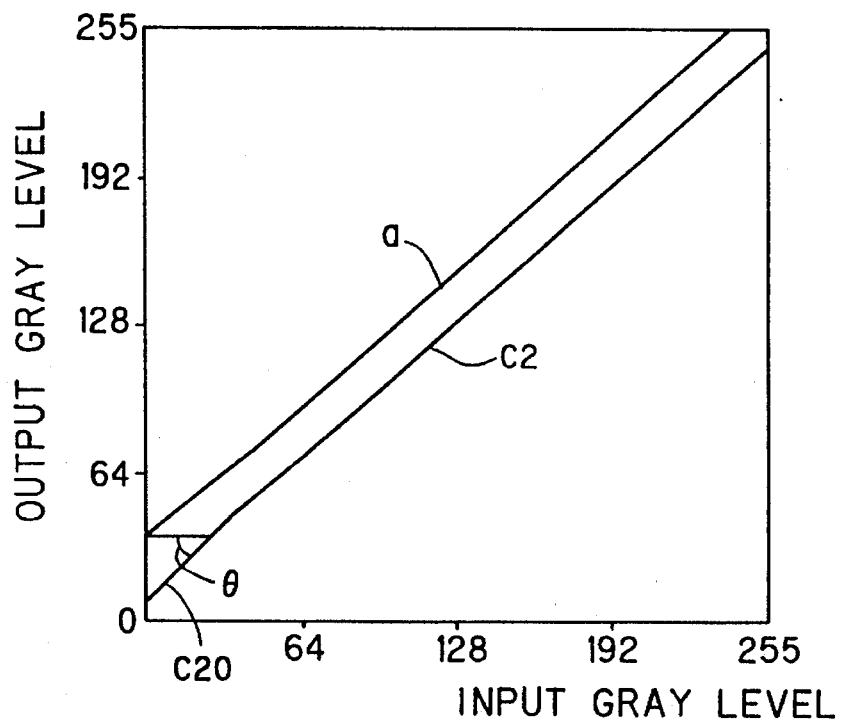
FIG. 12 is a graph showing input gray level-output gray level characteristics obtained by the fifth and sixth methods in a case where the designated copy density is lower than the reference copy density.
Figure 14:
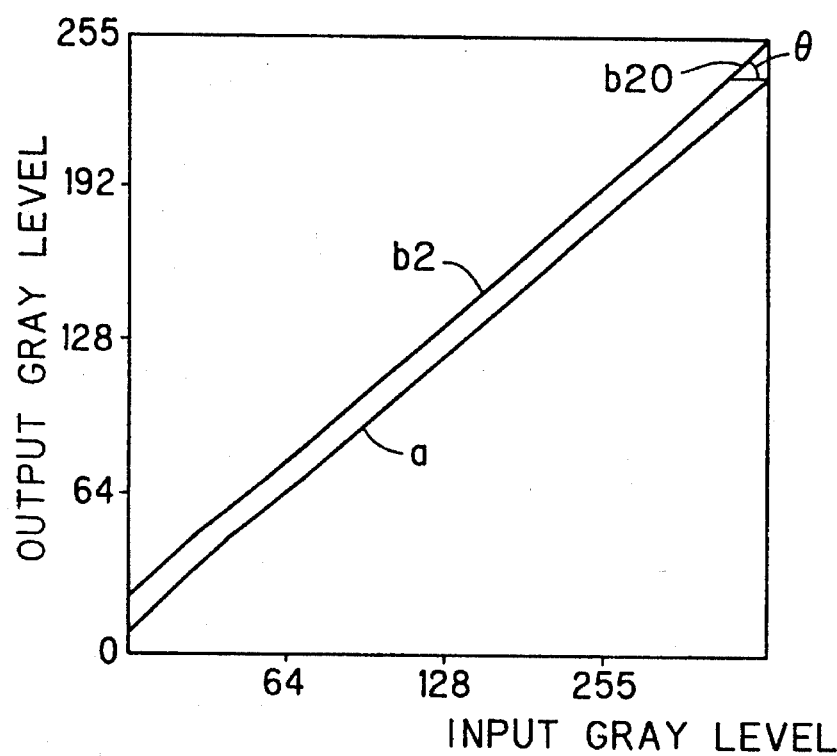
FIG. 14 is a graph showing input gray level-output gray level characteristics obtained by the fifth and sixth methods in a case where the designated copy density is higher than the reference copy density.

As shown in FIG. 12 or 14, the fifth method is one for shifting, in a case where input gray levels are used to enter the axis of abscissa, output gray levels are used to enter the axis of ordinate, and the original input gray level-output gray level characteristics (total output gray levels) are indicated by a graph line a, the graph line a to the left or right depending on the designated copy density, to convert the original input gray level-output gray level characteristics into characteristics corresponding to the designated copy density, and finding output gray levels relative to input gray levels at which there exist no output gray level data as the result of the above described shifting by a predetermined operation.

(V-1) Description is now made of the idea of the fifth method by taking as an example a case where the designated copy density is lower than the reference copy density.

Figure 11:
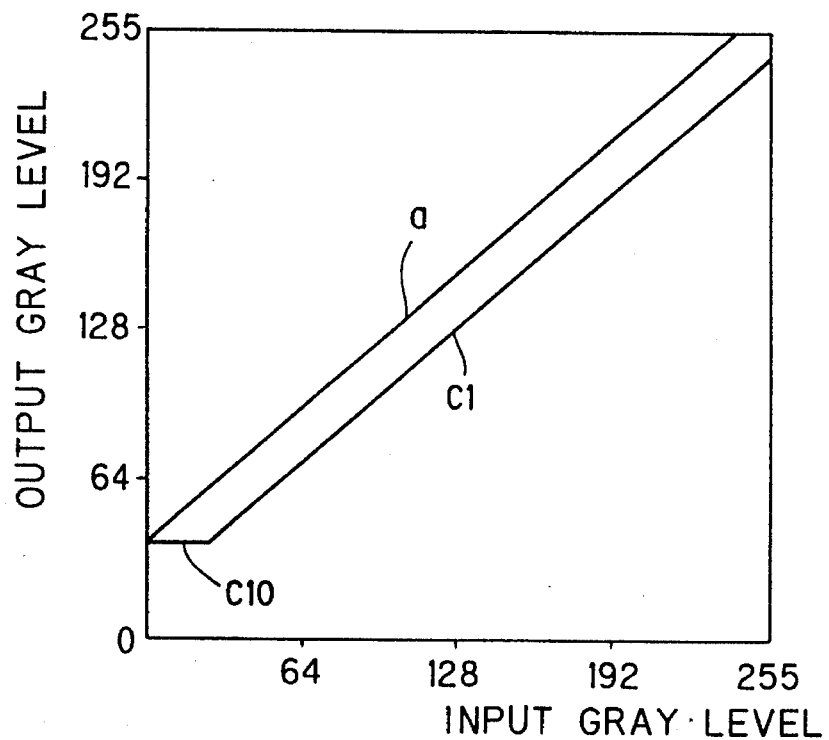
FIG. 11 is a graph showing input gray level-output gray level characteristics for explaining a fifth method and a sixth method in a case where the designated copy density is lower than the reference copy density.

FIGS. 11 and 12 show input gray level-output gray level characteristics in a case where input gray levels are used to enter the axis of abscissa and output gray levels are used to enter the axis of ordinate. A graph line a shown in FIGS. 11 and 12 indicates the original input gray level-output gray level characteristics. When the designated copy density is lower than the reference copy density, the original input gray level-output gray level characteristics are converted into characteristics obtained by shifting the graph line a indicating the original input gray level-output gray level characteristics to the right, as indicated by a graph line c1 in FIG. 11. The amount of the shifting is set to a value corresponding to the designated copy density. If the graph line a indicating the original input gray level-output gray level characteristics is merely shifted to the right, no input gray level-output gray level data exist in a portion at low input gray levels. Accordingly, input gray level-output gray level data in the portion are indicated by a graph line c20 in FIG. 12 which is a straight line having a gradient θ of, for example, 45°. The input gray levels are thus converted on the basis of input gray level-output gray level data c2 found.

(V-1-1) Description is made of a case where the designated copy density is lower than the reference copy density using the idea of converting specified addresses. The original input gray level-output gray level data indicated by the graph line a in FIGS. 11 and 12 is shown in Table 2.

TABLE 2

| INPUT GRAY LEVEL DATA | BASE ADDRESS (Oadr) | OUTPUT GRAY LEVEL DATA | | | | TOTAL GRAY LEVEL |
|---|---|---|---|---|---|---|
| | | $G_0$ | $G_1$ | $G_2$ | $G_3$ | |
| 0 | 0 | 9 | 9 | 9 | 9 | 36 |
| 1 | 1 | 10 | 9 | 9 | 9 | 37 |
| 2 | 2 | 10 | 10 | 9 | 9 | 38 |
| 3 | 3 | 10 | 10 | 9 | 10 | 39 |
| . | . | . | . | . | . | . |
| 219 | 219 | 64 | 64 | 63 | 64 | 255 |
| . | . | . | . | . | . | . |
| 255 | 255 | 64 | 64 | 63 | 64 | 255 |

The characteristics c1 obtained by shifting the graph line a indicating the original input gray level-output gray level characteristics shown in FIG. 11 to the right are obtained by converting base addresses Oadr into specified addresses Sadr using the same expression (9) as the foregoing expression (1):

$$Sadr = Oadr + Sft \quad (9)$$

If the value of Sft corresponding to the characteristics c1 shown in FIG. 11 is −25, the specified addresses Sadr corresponding to the base addresses Oadr 0 to 255 are converted into −25 to 230 by the expression (9). If the specified addresses are thus converted by setting the value of Sft to −25, the values of the specified addresses obtained by the conversion Sadr corresponding to the input gray level data 0 to 24 become smaller than the minimum value 0 of the base addresses Oadr. Consequently, there exist no output gray level data corresponding to the input gray level data 0 to 24.

In such a case, it is considered that the specified addresses Sadr corresponding to the input gray level data 0 to 24 are set to the minimum value 0 of the base addresses Oadr. Consequently, output gray level data corresponding to the input gray level data 0 to 24 are the same as output gray level data corresponding to the input gray level data 25. The specified addresses Sadr and the output gray level data corresponding to the input gray level data in such a case are as shown in Table 3. In addition, the output gray level data corresponding to the input gray level data 0 to 24 are graphically indicated by a straight portion c10 in FIG. 11.

TABLE 3

| INPUT GRAY LEVEL DATA | SPECIFIED ADDRESS (Sadr) | OUTPUT GRAY LEVEL DATA | | | | TOTAL GRAY LEVEL |
|---|---|---|---|---|---|---|
| | | $G_0$ | $G_1$ | $G_2$ | $G_3$ | |
| 0 | 0 | 9 | 9 | 9 | 9 | 36 |
| 1 | 0 | 9 | 9 | 9 | 9 | 36 |
| . | . | . | . | . | . | . |
| . | . | . | . | . | . | . |
| 24 | 0 | 9 | 9 | 9 | 9 | 36 |
| 25 | 0 | 9 | 9 | 9 | 9 | 36 |
| 26 | 1 | 10 | 9 | 9 | 9 | 37 |
| . | . | . | . | . | . | . |
| . | . | . | . | . | . | . |
| 234 | 219 | 64 | 64 | 63 | 64 | 255 |
| . | . | . | . | . | . | . |
| . | . | . | . | . | . | . |
| 255 | 230 | 64 | 64 | 63 | 64 | 255 |

In the fifth method, the output gray level data corresponding to the input gray level data which correspond to the specified addresses Sadr whose values are smaller than 0 (the input gray levels 0 to 24 in the above described example) are found on the basis of a predetermined rule from total output gray level data (36 in the above descried example) corresponding to the input gray level data which corresponds to the specified address Sadr whose value is 0 (the input gray level 25 in the above described example). This rule is so determined that total gray levels corresponding to the input gray level data 0 to 24 are decreased one at a time in descending order of input gray levels from the total gray level 36 corresponding to the input gray level data 25.

Such a rule is not limited to the foregoing rule. That is, other rules may be used. For example, the rule may be so determined that total gray levels corresponding to the input gray level data 0 to 24 are decreased a predetermined value other than one at a time in descending order of input gray levels from the total gray level 36 corresponding to the input gray level data 25. In addition, the rule may be so determined that total gray levels corresponding to the input gray level data 0 to 24 are decreased a predetermined value at a time in descending order of input gray levels and every a predetermined number of input gray levels from the total gray level 36 corresponding to the input gray level data 25.

Table 4 shows output gray levels corresponding to the input gray level data 0 to 24 so found that the total gray levels corresponding to the input gray level data 0 to 24 are decreased one at a time in descending order of input gray levels from the total gray level 36 corresponding to the input gray level data 25. In addition, the relationship between the input gray level data and the output gray level data in a case where input gray level-output gray level data corresponding to the input gray levels 0 to 24 are thus corrected is indicated by the graph line c2 in FIG. 12. This graph line c2 is obtained by shifting the graph line a shown in FIG. 12 by a predetermined amount to the right and indicating input gray level-output gray level characteristics corresponding to the input gray levels 0 to 24 by a straight portion c20 which is a straight line passing through a point, which corresponds to the input gray level data 25, on a graph line obtained by the shifting and having a gradient θ of 45°.

TABLE 4

| INPUT GRAY LEVEL DATA | SPECIFIED ADDRESS (Sadr) | OUTPUT GRAY LEVEL DATA | | | | TOTAL GRAY LEVEL |
|---|---|---|---|---|---|---|
| | | $G_0$ | $G_1$ | $G_2$ | $G_3$ | |
| 0 | −25 | 0 | 0 | 2 | 9 | 11 |
| 1 | −24 | 0 | 0 | 3 | 9 | 12 |
| . | . | . | . | . | . | . |
| 8 | −17 | 0 | 1 | 9 | 9 | 19 |
| 9 | −16 | 0 | 2 | 9 | 9 | 20 |
| . | . | . | . | . | . | . |
| 16 | −9 | 0 | 9 | 9 | 9 | 27 |
| 17 | −8 | 1 | 9 | 9 | 9 | 28 |
| . | . | . | . | . | . | . |
| 24 | −1 | 8 | 9 | 9 | 9 | 35 |
| 25 | 0 | 9 | 9 | 9 | 9 | 36 |

(V-1-2) Description is now made of processing actually performed.

In the actual processing, specified addresses are not converted in the address generating circuit 12. Specifically, an address specifying signal used as the basis corresponding to a pixel in the dither matrix which corresponds to input gray level data and a pixel position signal is outputted from the address generating circuit 12. The CPU 10 reads out input gray level-output gray level data corresponding to a developing color and the designated copy density from the data ROM 11 and transfers the same to the RAM 14 on the basis of the developing color and the designated copy density.

Transfer destination addresses to the table memory 13 corresponding to the input gray level-output gray level data transferred to the RAM 14 are converted. This conversion of the transfer destination addresses is represented by the same expression (10) as the foregoing expression (2):

$$NTadr = OTadr - Sft \tag{10}$$

The value of Sft corresponding to the designated copy density is previously determined and stored in the data ROM 11 or the other ROM. Base transfer destination addresses OTadr corresponding to respective input gray level-output gray level data in each of the areas $TE_0$, $TE_1$, $TE_2$ and $TE_3$ corresponding to the pixels $G_0$, $G_1$, $G_2$ and $G_3$ in the dither matrix are converted into new transfer destination addresses NTadr on the basis of the foregoing expression (10) from the value of Sft corresponding to the designated copy density. The respective data are transferred to the new transfer destination addresses NTadr in each of the areas $TE_0$, $TE_1$, $TE_2$ and $TE_3$ corresponding to the pixels $G_0$, $G_1$, $G_2$ and $G_3$ in the dither matrix in the table memory 13.

If the designated copy density is lower than the reference copy density and the value of Sft corresponding to the designated copy density is −25, the base transfer destination addresses OTadr 0 to 255 corresponding to the respective data are converted into new transfer destination addresses NTadr 25 to 280 by the foregoing expression (10). Data corresponding to the new transfer destination addresses NTadr whose values are larger than the maximum value 255 of the base transfer destination addresses OTadr are deleted.

By the conversion of the transfer destination addresses, blank transfer destination addresses at which there exist no data to be transferred (addresses 0 to 24 in the above described example) are generated in a portion assigned small addresses in each of the areas $TE_0$, $TE_1$, $TE_2$ and $TE_3$ in the table memory 13. Therefore, output gray level data corresponding to the blank transfer destination addresses are generated in the following manner.

The output gray level data corresponding to the blank transfer destination addresses are found on the basis of a predetermined rule from output gray level data corresponding to the minimum value of the new transfer destination addresses NTadr. This rule is so determined that total gray levels corresponding to the respective blank transfer destination addresses are decreased one at a time in descending order of blank transfer destination addresses from the total gray level (36 in the above described example) corresponding to the minimum value of the new transfer destination addresses NTadr (25 in the above described example). The output gray level data corresponding to the blank transfer destination addresses 0 to 24 are the same as the output gray level data corresponding to the input gray level data 0 to 24 shown in Table 4.

If output gray level data corresponding to the whole of each of the areas $TE_0$, $TE_1$, $TE_2$ and $TE_3$ in the table memory 13 are thus generated in the RAM 14, the data are transferred to the table memory 13 from the RAM 14. Thereafter, if an address specifying signal is outputted from the address generating circuit 12, data is outputted from a corresponding address in the table memory 13.

(V-2) Description is made of a case where the designated copy density is higher than the reference copy density.

Figure 13:
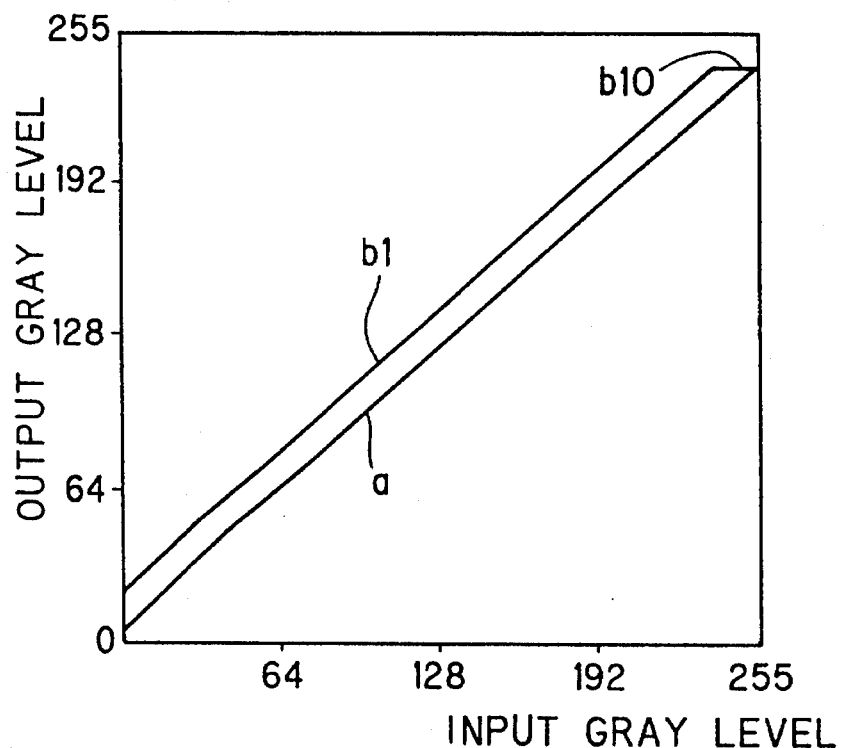
FIG. 13 is a graph showing input gray level-output gray level characteristics for explaining the fifth and sixth methods in a case where the designated copy density is higher than the reference copy density.

A graph line a shown in FIGS. 13 and 14 indicates the original input gray level-output gray level characteristics. When the designated copy density is higher than the reference copy density, the original input gray level-output gray level characteristics are converted into characteristics obtained by shifting the graph line a indicating the original input gray level-output gray level characteristics to the left, as indicated by a graph line b1 in FIG. 13. The amount of the shifting is set to a value corresponding to the designated copy density. If the graph line a indicating the original input gray level-output gray level characteristics is merely shifted to the left, no input gray level-output gray level data exist in a portion at high input gray levels. Accordingly, input gray level-output gray level data in the portion are indicated by a graph line b20 in FIG. 14 which is a straight line having a gradient θ of 45°. The input gray levels are thus converted on the basis of input gray level-output gray level data b2 found.

(V-2-1) Description is made of a case where the designated copy density is higher than the reference copy density using the idea of converting specified addresses.

If the designated copy density is higher than the reference copy density and the value of Sft in the foregoing expression (9) is +15, specified addresses Sadr corresponding to input gray level data 0 to 255 (base addresses Oadr) are converted into 15 to 270.

If the specified addresses are thus converted by setting the value of Sft to +15, the values of specified addresses obtained by the conversion Sadr corresponding to input gray level data 241 to 255 become larger than the maximum value 255 of the base addresses Oadr. Consequently, there exist no output gray level data corresponding to the input gray level data 241 to 255.

In such a case, it is considered that the specified addresses Sadr corresponding to the input gray level data 241 to 255 are set to the maximum value 255 of the base addresses Oadr. Consequently, output gray level data corresponding to the input gray level data 241 to 255 are the same as output gray level data corresponding to the input gray level data 240. The output gray level data corresponding to the input gray level data 241 to 255 are graphically indicated by a straight portion b10 in FIG. 13.

In the fifth method, the output gray level data corresponding to the input gray level data which correspond to the specified addresses Sadr whose values are larger than 255 (the input gray levels 241 to 255 in the above described example) are found on the basis of a predetermined rule from total output gray level data corresponding to the input gray level data which corresponds to the specified address Sadr whose value is 255 (the input gray level 240 in the above described example). This rule is so determined that total gray levels corresponding to the input gray level data 241 to 255 are increased one at a time in ascending order of input gray levels from a total gray level corresponding to the input gray level data 240.

Such a rule is not limited to the foregoing rule. That is, other rules may be used. For example, the rule may be so determined that total gray levels corresponding to the input gray level data 241 to 255 are increased a predetermined value other than one at a time in ascending order of input gray levels from the total gray level corresponding to the input gray level data 240. In addition, the rule may be so determined that total gray levels corresponding to the input gray level data 241 to 255 are increased a predetermined value at a time in ascending order of input gray levels and every a predetermined number of input gray levels from the total gray level corresponding to the input gray level data 240.

The relationship between the input gray level data and the output gray level data in a case where input gray level-output gray level data corresponding to the input gray levels 241 to 255 are so corrected that the total gray levels corresponding to the input gray level data 241 to 255 are increased one at a time in ascending order of input gray levels from the total gray level corresponding to the input gray level data 240 is indicated by a graph line b2 in FIG. 14. This graph line b2 is obtained by shifting the graph line a in FIG. 14 by a predetermined amount to the left and indicating input gray level-output gray level characteristics corresponding to the input gray levels 241 to 255 by a straight portion b20 which is a straight line passing through a point, which corresponds to the input gray level data 240, on a graph line obtained by the shifting and having a gradient θ of 45°.

(V-2-2) Description is made of a processing method actually carried out in a case where the designated copy density is higher than the reference copy density.

In the actual processing, specified addresses are not converted in the address generating circuit 12. Specifically, an address specifying signal used as the basis is outputted from the address generating circuit 12. The CPU 10 reads out input gray level-output gray level data corresponding to a developing color and the designated copy density from the data ROM 11 and transfers the same to the RAM 14 on the basis of the developing color and the designated copy density. Transfer destination addresses to the table memory 13 corresponding to the input gray level-output gray level data transferred to the RAM 14 are converted on the basis of the foregoing expression (10).

If the designated copy density is higher than the reference copy density and the value of Sft in the foregoing expression (10) is +15, the base transfer destination addresses OTadr 0 to 255 corresponding to the respective data are converted into new transfer destination addresses NTadr −15 to 240. Data corresponding to the new transfer destination addresses NTadr whose values are smaller than the minimum value 0 of the base transfer destination addresses OTadr are deleted.

By the conversion of the transfer destination addresses, blank transfer destination addresses at which there exist no data to be transferred (addresses 241 to 255 in the above described example) are generated in a portion assigned large addresses in each of the areas $TE_0$, $TE_1$, $TE_2$ and $TE_3$ in the table memory 13. Therefore, output gray level data corresponding to the blank transfer destination addresses are generated in the following manner.

The output gray level data corresponding to the blank transfer destination addresses are found on the basis of a predetermined rule from output gray level data corresponding to the maximum value of the new transfer destination addresses NTadr. This rule is so determined that total gray levels corresponding to the respective blank transfer destination addresses are increased one at a time in ascending order of blank transfer destination addresses from the total gray level corresponding to the maximum value of the new transfer destination addresses NTadr (240 in the above described example).

If output gray level data corresponding to the whole of each of areas $TE_0$, $TE_1$, $TE_2$ and $TE_3$ in the table memory 13 are thus generated in the RAM 14, the data are transferred to the table memory 13 from the RAM 14. Thereafter, if an address specifying signal is outputted from the address generating circuit 12, data is outputted from a corresponding address in the table memory 13.

If the input gray level-output gray level characteristics obtained by the above described fifth method which are indicated by the graph line b2 or c2 in FIG. 12 or 14 are compared with the original input gray level-output gray level characteristics which are indicated by the graph line a in FIG. 12 or 14, the value of an output gray level at a point on the characteristic curve b2 or c2 is unchanged from the value of an output gray level at a corresponding point on the characteristic curve a. Accordingly, the relationship between the output gray level data and the density at which printing is actually done in the original input gray level-output gray level characteristics can be maintained. Therefore, the relationship between the input gray level data and the density at which printing is actually done can be made linear. In addition, the range of output gray levels is not extremely decreased, as compared with that in the method of merely adding or subtracting an offset value to or from an output gray level found by the original input gray level-output gray level data.

(VI) Sixth Method

The sixth method is one for converting the original input gray level-output gray level characteristics (indicated by the graph line a in FIG. 12 or 14) into characteristics obtained by shifting the graph line a2 to the left or right (indicated by the graph line b2 or c2) depending on the designated copy density and then, finding output gray levels relative to input gray levels at which there exist no output gray level data by a method different from the fifth method.

(VI-1) Description is now made of the idea of the sixth method by taking as an example a case where the designated copy density is higher than the reference copy density.

When the designated copy density is higher than the reference copy density, the original input gray level-output gray level characteristics are converted into characteristics obtained by shifting the graph line a indicating the original input gray level-output gray level characteristics to the left, as indicated by the graph line b1 in FIG. 13. The amount of the shifting is set to a value corresponding to the designated copy density. If the graph line a indicating the original input gray level-output gray level characteristics is merely shifted to the left, no input gray level-output gray level data exist in a portion at high input gray levels. Accordingly, input gray level-output gray level data in the portion are indicated by a graph line b20 in FIG. 14 which is a straight line having a gradient θ of, for example, 45°. The input gray levels are thus converted on the basis of the input gray level-output gray level data b2 found.

(VI-1-1) Description is made of a case where the designated copy density is higher than the reference copy density using the idea of converting specified addresses. The original input gray level-output gray level data in indicated by the graph line a in FIGS. 13 and 14 is shown in Table 5.

TABLE 5

| INPUT GRAY LEVEL DATA | BASE ADDRESS (Oadr) | OUTPUT GRAY LEVEL DATA | | | | TOTAL GRAY LEVEL | DITHER STEP | DITHER FATTING PATTERN |
|---|---|---|---|---|---|---|---|---|
| | | $G_0$ | $G_1$ | $G_2$ | $G_3$ | | | |
| 0 | 0 | 2 | 1 | 1 | 2 | 6 | 0 | — |
| 1 | 1 | 2 | 1 | 2 | 2 | 7 | 1 | 2 |
| 2 | 2 | 2 | 2 | 2 | 2 | 8 | 2 | 1 |
| 3 | 3 | 3 | 2 | 2 | 2 | 9 | 3 | 0 |
| 4 | 4 | 3 | 2 | 2 | 3 | 10 | 0 | 3 |
| 5 | 5 | 3 | 2 | 3 | 3 | 11 | 1 | 2 |
| 6 | 6 | 3 | 3 | 3 | 3 | 12 | 2 | 1 |
| 7 | 7 | 4 | 3 | 3 | 3 | 13 | 3 | 0 |
| 8 | 8 | 4 | 3 | 3 | 4 | 14 | 0 | 3 |
| 9 | 9 | 4 | 3 | 4 | 4 | 15 | 1 | 2 |
| 10 | 10 | 4 | 4 | 4 | 4 | 16 | 2 | 1 |
| . | . | . | . | . | . | . | . | . |
| . | . | . | . | . | . | . | . | . |
| 248 | 248 | 55 | 54 | 54 | 55 | 218 | 0 | 3 |
| 249 | 249 | 55 | 54 | 55 | 55 | 219 | 1 | 2 |
| 250 | 250 | 55 | 55 | 55 | 55 | 220 | 2 | 1 |

TABLE 5-continued

| INPUT GRAY LEVEL DATA | BASE ADDRESS (Oadr) | OUTPUT GRAY LEVEL DATA | | | | TOTAL GRAY LEVEL | DITHER STEP | DITHER FATTING PATTERN |
|---|---|---|---|---|---|---|---|---|
| | | $G_0$ | $G_1$ | $G_2$ | $G_3$ | | | |
| 251 | 251 | 56 | 55 | 55 | 55 | 221 | 3 | 0 |
| 252 | 252 | 56 | 55 | 55 | 56 | 222 | 0 | 3 |
| 253 | 253 | 56 | 55 | 56 | 56 | 223 | 1 | 2 |
| 254 | 254 | 56 | 56 | 56 | 56 | 224 | 2 | 1 |
| 255 | 255 | 57 | 56 | 56 | 56 | 225 | 3 | 0 |

In Table 5, the dither step indicates the order of threshold values in the dither matrix used for generating input gray level-output gray level data which corresponds to a gray scale pattern in a dither matrix of a Bayer type, a spiral type, a dot type or the like. In this example, there are four dither steps 0, 1, 2 and 3. The dither steps 0, 1, 2 and 3 are repeated in sets of four and are respectively assigned to input gray level data in ascending order of their input gray levels.

Furthermore, the dither fatting pattern indicates which of output gray levels corresponding to the pixels $G_0$, $G_1$, $G_2$ and $G_3$ in the dither matrix with respect to an input gray level is made higher than an output gray level corresponding to the corresponding pixel with respect to an input gray level which is lower by one. When an output gray level corresponding to the pixel $G_0$ out of the pixels $G_0$, $G_1$, $G_2$ and $G_3$ with respect to an input gray level is higher than an output gray level corresponding to the pixel $G_0$ with respect to an input gray level which is lower by one, the dither fatting pattern is 0. When an output gray level corresponding to the pixel $G_1$ out of the pixels with respect to an input gray level is higher than an output gray level corresponding to the pixel $G_1$ with respect to an input gray level which is lower by one, the dither fatting pattern is 1. When an output gray level corresponding to the pixel $G_2$ out of the pixels with respect to an input gray level is higher than an output gray level corresponding to the pixel $G_2$ with respect to an input gray level which is lower by one, the dither fatting pattern is 2. When an output gray level corresponding to the pixel $G_3$ out of the pixels with respect to an input gray level is higher than an output gray level corresponding to the pixel $G_3$ with respect to an input gray level which is lower by one, the dither fatting pattern is 3.

The characteristics b1 obtained by shifting the graph line a indicating the original input gray level-output gray level characteristics shown in FIG. 13 to the left are obtained by converting base addresses Oadr by the same expression (11) as the foregoing expression (1):

$$Sadr = Oadr + Sft \quad (11)$$

If the value of Sft corresponding to the characteristics b1 shown in FIG. 13 is +15, the base addresses Oadr 0 to 255 are converted into specified addresses Sadr 15 to 270 by the expression (11). If the specified addresses are thus converted by setting the value of Sft to +15, the values of the specified addresses obtained by the conversion Sadr corresponding to the input gray level data 241 to 255 become larger than the maximum value 255 of the base addresses Oadr. Consequently, there exist no output gray level data corresponding to the input gray level data 241 to 255.

In such a case, it is considered that the specified addresses Sadr corresponding to the input gray level data 241 to 255 are set to the maximum value 255 of the base addresses Oadr. Consequently, output gray level data corresponding to the input gray level data 241 to 255 are the same as output gray level data corresponding to the input gray level data 240. The specified addresses Sadr and the output gray level data corresponding to the input gray level data in such a case are as shown in Table 6. In addition, the output gray level data corresponding to the input gray level data 241 to 255 are graphically indicated by a straight portion b10 in FIG. 13.

TABLE 6

| INPUT GRAY LEVEL DATA | SPECIFIED ADDRESS (Sadr) | OUTPUT GRAY LEVEL DATA | | | | TOTAL GRAY LEVEL | DITHER STEP | DITHER FATTING PATTERN |
|---|---|---|---|---|---|---|---|---|
| | | $G_0$ | $G_1$ | $G_2$ | $G_3$ | | | |
| 0 | 15 | 6 | 5 | 5 | 5 | 21 | 3 | 0 |
| 1 | 16 | 6 | 5 | 5 | 6 | 22 | 0 | 3 |
| 2 | 17 | 6 | 5 | 6 | 6 | 23 | 1 | 2 |
| 3 | 18 | 6 | 6 | 6 | 6 | 24 | 2 | 1 |
| 4 | 19 | 7 | 6 | 6 | 6 | 25 | 3 | 0 |
| . | . | . | . | . | . | . | . | . |
| 233 | 248 | 55 | 54 | 54 | 55 | 218 | 0 | 3 |
| 234 | 249 | 55 | 54 | 55 | 55 | 219 | 1 | 2 |
| 235 | 250 | 55 | 55 | 55 | 55 | 220 | 2 | 1 |
| 236 | 251 | 56 | 55 | 55 | 55 | 221 | 3 | 0 |
| 237 | 252 | 56 | 55 | 55 | 56 | 222 | 0 | 3 |
| 238 | 253 | 56 | 55 | 56 | 56 | 223 | 1 | 2 |
| 239 | 254 | 56 | 56 | 56 | 56 | 224 | 2 | 1 |

TABLE 6-continued

| INPUT GRAY LEVEL DATA | SPECIFIED ADDRESS (Sadr) | OUTPUT GRAY LEVEL DATA | | | | TOTAL GRAY LEVEL | DITHER STEP | DITHER FATTING PATTERN |
|---|---|---|---|---|---|---|---|---|
| | | $G_0$ | $G_1$ | $G_2$ | $G_3$ | | | |
| 240 | 255 | 57 | 56 | 56 | 56 | 225 | 3 | 0 |
| 241 | 255 | 57 | 56 | 56 | 56 | 225 | — | — |
| 242 | 255 | 57 | 56 | 56 | 56 | 225 | — | — |
| 243 | 255 | 57 | 56 | 56 | 56 | 225 | — | — |
| . | . | . | . | . | . | . | — | — |
| . | . | . | . | . | . | . | — | — |
| . | . | . | . | . | . | . | — | — |
| 255 | 255 | 57 | 56 | 56 | 56 | 225 | — | — |

In the sixth method, the output gray level data corresponding to the input gray level data which correspond to the specified addresses Sadr whose values are larger than 225 (the input gray levels 241 to 255 in the above described example) are found in the following manner.

First, dither fatting patterns corresponding to dither steps are found on the basis of output gray level data with respect to continuous four input gray level data. For example, dither fatting patterns corresponding to dither steps are found on the basis of output gray levels with respect to an input gray level which corresponds to the specified address Sadr whose value is 255 (the input gray 240 in the above described example) and three input gray levels sequentially decreased one at a time from the input gray level (the input gray levels 239, 238 and 237 in the above described example).

The dither steps corresponding to the input gray levels 237 to 240 are respectively found from values left after the specified addresses obtained by the conversion Sadr corresponding to the input gray levels 237 to 240 divided by 4, and are respectively 0, 1, 2 and 3. In addition, the dither fatting patterns corresponding to the input gray levels 237 to 240 are found by, for example, checking to see which of output gray levels corresponding to the pixels $G_0$, $G_1$, $G_2$ and $G_3$ with respect to each of the input gray levels is higher than an output gray level corresponding to the corresponding pixel with respect to an input gray level which is lower by one, and are respectively 3, 2, 1 and 0. That is, the dither steps 0, 1, 2 and 3 correspond to the dither fatting patterns 3, 2, 1 and 0.

The dither steps corresponding to the input gray levels 241 to 255 which correspond to the specified addresses Sadr whose values are larger than 255 are then found. The dither steps corresponding to the input gray levels 241 to 255 are respectively found from values left after the specified addresses obtained by the conversion Sadr corresponding to the input gray levels 241 to 255 divided by 4. The dither fatting patterns corresponding to the input gray levels 241 to 255 are then found on the basis of the relationship between the dither steps which have been already found and the dither fatting patterns and the dither steps corresponding to the input gray levels 241 to 255.

Output gray levels corresponding to the input gray levels 241 to 255 which correspond to the specified addresses obtained by the conversion Sadr whose values are larger than 255 are found using the dither fatting patterns found in the above described manner from the output gray level corresponding to the input gray level 240 which corresponds to the specified address Sadr whose value is 255.

Table 7 shows the output gray level data corresponding to the input gray level data 241 to 255 found in the above described manner. In addition, the relationship between the input gray level data and the output gray level data in a case where input gray level-output gray level data corresponding to the input gray levels 241 to 255 are thus corrected is indicated by the graph line b2 in FIG. 14. This graph line b2 is obtained by shifting the graph line a in FIG. 14 by a predetermined amount to the left and indicating input gray level-output gray level characteristics corresponding to the input gray levels 241 to 255 by a straight portion b20 which is a straight line passing through a point, which corresponds to the input gray level 240, on a graph line obtained by the shifting and having a gradient θ of 45°.

TABLE 7

| INPUT GRAY LEVEL DATA | SPECIFIED ADDRESS (Sadr) | OUTPUT GRAY LEVEL DATA | | | | TOTAL GRAY LEVEL | DITHER STEP | DITHER FATTING PATTERN |
|---|---|---|---|---|---|---|---|---|
| | | $G_0$ | $G_1$ | $G_2$ | $G_3$ | | | |
| . | . | . | . | . | . | . | . | . |
| . | . | . | . | . | . | . | . | . |
| . | . | . | . | . | . | . | . | . |
| 237 | 252 | 56 | 55 | 55 | 56 | 222 | 0 | 3 |
| 238 | 253 | 56 | 55 | 56 | 56 | 223 | 1 | 2 |
| 239 | 254 | 56 | 56 | 56 | 56 | 224 | 2 | 1 |
| 240 | 255 | 57 | 56 | 56 | 56 | 225 | 3 | 0 |
| 241 | 256 | 57 | 56 | 56 | 57 | 226 | (0) | (3) |
| 242 | 257 | 57 | 56 | 57 | 57 | 227 | (1) | (2) |
| 243 | 258 | 57 | 57 | 57 | 57 | 228 | (2) | (1) |
| 244 | 259 | 58 | 57 | 57 | 57 | 229 | (3) | (0) |
| 245 | 260 | 58 | 57 | 57 | 58 | 230 | (0) | (3) |
| 246 | 261 | 58 | 57 | 58 | 58 | 231 | (1) | (2) |

TABLE 7-continued

| INPUT GRAY LEVEL DATA | SPECIFIED ADDRESS (Sadr) | OUTPUT GRAY LEVEL DATA | | | | TOTAL GRAY LEVEL | DITHER STEP | DITHER FATTING PATTERN |
|---|---|---|---|---|---|---|---|---|
| | | $G_0$ | $G_1$ | $G_2$ | $G_3$ | | | |
| 247 | 262 | 58 | 58 | 58 | 58 | 232 | (2) | (1) |
| 248 | 263 | 59 | 58 | 58 | 58 | 233 | (3) | (0) |
| 249 | 264 | 59 | 58 | 58 | 59 | 234 | (0) | (3) |
| 250 | 265 | 59 | 58 | 59 | 59 | 235 | (1) | (2) |
| 251 | 266 | 59 | 59 | 59 | 59 | 236 | (2) | (1) |
| 252 | 267 | 60 | 59 | 59 | 59 | 237 | (3) | (0) |
| 253 | 268 | 60 | 59 | 59 | 60 | 238 | (0) | (3) |
| 254 | 269 | 60 | 59 | 60 | 60 | 239 | (1) | (2) |
| 255 | 270 | 60 | 60 | 60 | 60 | 240 | (2) | (1) |

(VI-1-2) Description is now made of processing actually performed.

In the actual processing, specified addresses are not converted in the address generating circuit 12. Specifically, an address specifying signal used as the basis corresponding to a pixel in the dither matrix which corresponds to input gray level data and a pixel position signal is outputted from the address generating circuit 12. The CPU 10 reads out input gray level-output gray level data corresponding to a developing color and the designated copy density from the data ROM 11 and transfers the same to the RAM 14 on the basis of the developing color and the designated copy density.

Transfer destination addresses to the table memory 13 corresponding to the input gray level-output gray level data transferred to the RAM 14 are converted. This conversion of the transfer destination addresses is represented by the same expression (12) as the foregoing expression (2):

$$NTadr=OTadr-Sft \qquad (12)$$

The value of Sft corresponding to the designated copy density is previously determined and stored in the data ROM 11 or the other ROM. Base transfer destination addresses OTadr corresponding to respective input gray level-output gray level data to be transferred are converted into new transfer destination addresses NTadr on the basis of the foregoing expression (12) from the value of Sft corresponding to the designated copy density.

If the designated copy density is higher than the reference copy density and the value of Sft is +15, the base transfer destination addresses Oadr 0 to 255 corresponding to the respective data are converted into new transfer destination addresses NTadr −15 to 240 by the foregoing expression (12). Data corresponding to the new transfer destination addresses NTadr whose values are smaller than the minimum value 0 of the base transfer destination addresses OTadr are deleted.

By the conversion of the transfer destination addresses, blank transfer destination addresses at which there exist no data to be transferred (addresses 241 to 255 in the above described example) are generated in a portion assigned large addresses in each of the areas $TE_0$, $TE_1$, $TE_2$ and $TE_3$ in the table memory 13. Therefore, output gray level data corresponding to the blank transfer destination addresses are found in the same method as the sixth method of finding the output gray level data corresponding to the input gray level data 241 to 255 in Table 7 described in the item (VI-I-1). Therefore, output gray level data corresponding to the blank transfer destination addresses 241 to 255 (output gray level data corresponding to the input gray level data 241 to 255) are the same as the output gray level data corresponding to the input gray level data 241 to 255 in Table 7.

If output gray level data corresponding to the whole of each of the areas $TE_0$, $TE_1$, $TE_2$ and $TE_3$ in the table memory 13 are thus generated in the RAM 14, the data are transferred to the table memory 13 from the RAM 14. Thereafter, if an address specifying signal is outputted from the address generating circuit 12, data is outputted from a corresponding address in the table memory 13.

(VI-2) Description is made of a case where the designated copy density is lower than the reference copy density.

If the designated copy density is lower than the reference copy density, the original input gray level-output gray level characteristics are converted into characteristics obtained by shifting the graph line a indicating the original input gray level-output gray level characteristics to the right, as indicated by the graph line c1 in FIG. 11. The amount of the shifting is set to a value corresponding to the designated copy density. If the graph line a indicating the original input gray level-output gray level characteristics is merely shifted to the right, no input gray level-output gray level data exist in a portion at low input gray levels. Accordingly, input gray level-output gray level data in the portion are indicated by a graph line c20 in FIG. 12 which is a straight line having a gradient θ of, for example, 45°. The input gray levels are thus converted on the basis of the input gray level-output gray level data c2 found.

(VI-2-1) Description is made of a case where the designated copy density is lower than the reference copy density using the idea of converting specified addresses.

If the designated copy density is lower than the reference copy density and the value of Sft in the foregoing expression (11) is −25, specified addresses corresponding to base addresses Oadr 0 to 255 are converted into −25 to 230. If the specified addresses are thus converted by setting the value of Sft to −25, the values of specified addresses obtained by the conversion Sadr corresponding to the input gray level data 0 to 24 become smaller than the minimum value 0 of the base addresses Oadr. Consequently, there exist no output gray level data corresponding to the input gray level data 0 to 24.

In such a case, it is considered that the specified addresses Sadr corresponding to the input gray level data 0 to 24 are set to the minimum value 0 of the base addresses Oadr. Consequently, output gray level data corresponding to the input gray level data 0 to 24 are the same as output gray level data corresponding to the input gray level data 25. The output gray level data corresponding to the input gray level data 0 to 24 in such a case are graphically indicated by a straight portion c10 in FIG. 11.

In the sixth method, the output gray level data corresponding to the input gray level data which correspond to the specified addresses obtained by the conversion Sadr whose values are smaller than 0 (the input gray levels 0 to 24 in the above described example) are found in the following manner.

First, dither fatting patterns corresponding to dither steps are found on the basis of output gray levels corresponding to continuous four input gray levels. Dither steps corresponding to the input gray levels which correspond to the specified addresses obtained by the conversion Sadr whose values are smaller than 0 (the input gray levels 0 to 24 in the above described example) are then found, to find dither fatting patterns corresponding to the input gray levels 0 to 24.

The output gray levels corresponding to the input gray levels 0 to 24 which correspond to the specified addresses Sadr whose values are smaller than 0 are found using the dither fatting patterns found in the above described manner from the output gray level corresponding to the input gray level which corresponds to the specified address Sadr whose value is 0 (the input gray level 25 in the above described example).

The relationship between the input gray level data and the output gray level data in a case where input gray level-output gray level data corresponding to the input gray levels 0 to 24 thus found are corrected is indicated by the graph line c2 in FIG. 12. This graph line c2 is obtained by shifting the graph line a in FIG. 12 by a predetermined amount to the right and indicating input gray level-output gray level characteristics corresponding to the input gray levels 0 to 24 by a straight portion c20 which is a straight line passing through a point, which corresponds to the input gray level data 25, on a graph line obtained by the shifting and having a gradient θ of 45°.

(VI-2-2) Description is made of a processing method actually carried out in a case where the designated copy density is lower than the reference copy density.

In the actual processing, specified addresses are not converted in the address generating circuit 12. Specifically, an address specifying signal used as the basis corresponding to a pixel in the dither matrix which corresponds to input gray level data and a pixel position signal is outputted from the address generating circuit 12. The CPU 10 reads out input gray level-output gray level data corresponding to a developing color and the designated copy density from the data ROM 11 and transfers the same to the RAM 14 on the basis of the developing color and the designated copy density.

Transfer destination addresses to the table memory 13 corresponding to the input gray level-output gray level data transferred to the RAM 14 are converted using the foregoing expression (12).

If the designated copy density is lower than the reference copy density and the value of Sft in the foregoing expression (12) is −25, the base transfer destination addresses OTadr 0 to 255 corresponding to the respective data are converted into new transfer destination addresses NTadr 25 to 280. Data corresponding to the new transfer destination addresses NTadr whose values are larger than the maximum value 255 of the base transfer destination addresses OTadr are deleted.

By the conversion of the transfer destination addresses, blank transfer destination addresses at which there exist no data to be transferred (addresses 0 to 24 in the above described example) are generated in a portion assigned small addresses in each of the areas $TE_0$, $TE_1$, $TE_2$ and $TE_3$ in the table memory 13. Therefore, output gray level data corresponding to the blank transfer destination addresses are generated in the same method as the sixth method of finding the output gray level data corresponding to the input gray level data 0 to 24 described in the item (VI-2-1).

If output gray level data corresponding to the whole of each of the areas $TE_0$, $TE_1$, $TE_2$ and $TE_3$ in the table memory 13 are thus generated in the RAM 14, the data are transferred to the table memory 13 from the RAM 14. Thereafter, if an address specifying signal is outputted from the address generating circuit 12, data is outputted from a corresponding address in the table memory 13.

If the input gray level-output gray level characteristics obtained by the above described sixth method which are indicated by the graph line b2 or c2 in FIG. 12 or 14 are compared with the original input gray level-output gray level characteristics which are indicated by the graph line a in FIG. 12 or 14, the value of an output gray level at a point on the characteristic curve b2 or c2 is unchanged from the value of an output gray level at a corresponding point on the characteristic curve a. Accordingly, the relationship between the input gray level data and the density at which printing is actually done in the original input gray level-output gray level characteristics can be maintained. Therefore, the relationship between the input gray level data and the density at which printing is actually done can be made linear. In addition, the range of output gray levels is not extremely decreased, as compared with that in the method of merely adding or subtracting an offset value to or from an output gray level found by the original input gray level-output gray level data.

(VII) Seventh Method

Figure 16:
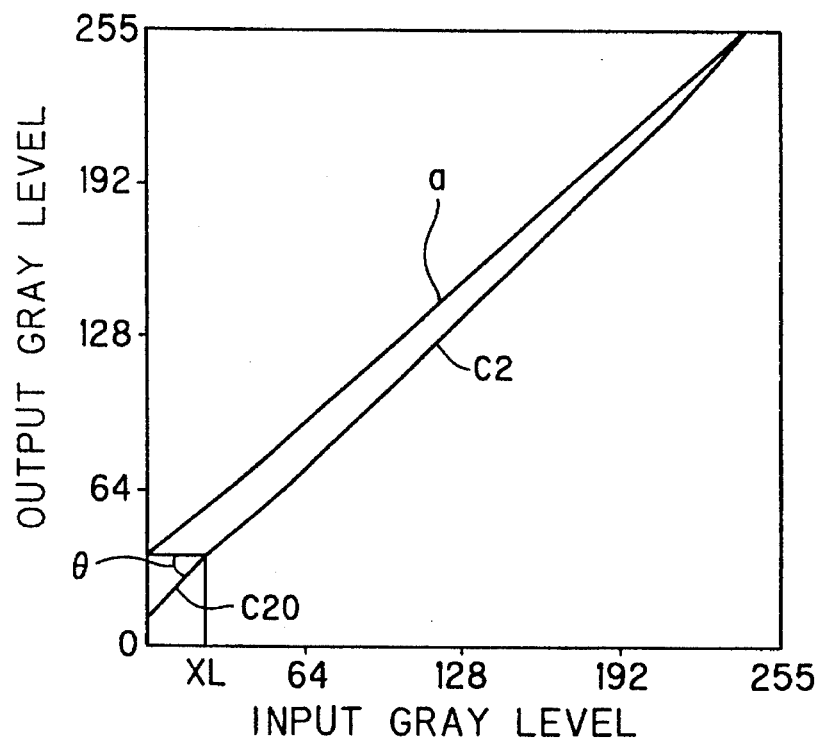
FIG. 16 is a graph showing input gray level-output gray level characteristics obtained in a case where the seventh method is used.

As shown in FIG. 16, the seventh method is one for rotating, in a case input gray levels are used to enter the axis of abscissa, output gray levels are used to enter the axis of ordinate, and the original input gray level-output gray level characteristics are indicated by a graph line a, the graph line a through a predetermined angle in a clockwise direction or in a counterclockwise direction around a point, which corresponds to the highest output gray level, on the graph line a depending on the designated copy density, to convert the original input gray level-output gray level characteristics into characteristics corresponding to the designated copy density, and finding output gray levels relative to input gray levels at which there exist no output gray level data as the result of the above described conversion by a predetermined operation.

(VII-1) Description is now made of the idea of the seventh method by taking as an example a case where the designated copy density is lower than the reference copy density.

Figure 15:
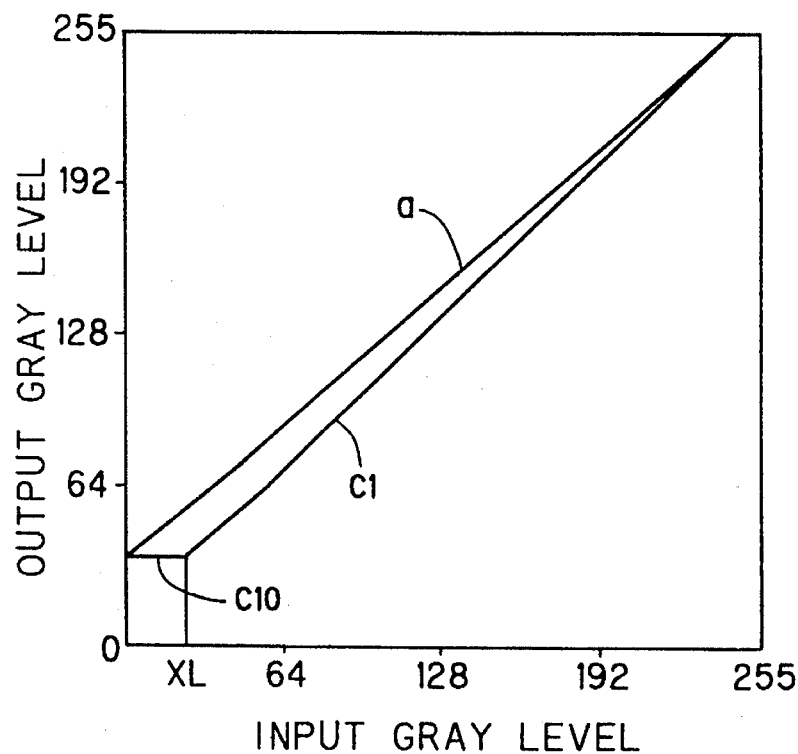
FIG. 15 is a graph showing input gray level-output gray level characteristics for explaining a seventh method.

FIGS. 15 and 16 show input gray level-output gray level characteristics in a case where input gray levels are used to enter the axis of abscissa and output gray levels are used to enter the axis of ordinate. A graph line a shown in FIGS. 15 and 16 indicates the original input gray level-output gray level characteristics. When the designated copy density is lower than the reference copy density, the original input gray level-output gray level characteristics are converted into characteristics obtained by rotating the graph line a indicating the original input gray level-output gray level characteristics through a predetermined angle in a counterclockwise direction around a point, which corresponds to the highest output gray level, on the graph line a, as indicated by a graph line c1 in FIG. 15. The angle of rotation is set to a value corresponding to the designated copy density. If the graph line a indicating the original input gray level-output gray level characteristics is merely rotated in a counterclockwise direction, no input gray level-output gray level data exist in a portion at low input gray levels. Accordingly, input gray level-output gray level data in the portion are indicated by a graph line c20 in FIG. 16 which is a straight line having a gradient θ of, for example, 45°. The input gray levels are thus converted on the basis of input gray level-output gray level data c2 found.

(VII-1-1) Description is made of a case where the designated copy density is lower than the reference copy density using the idea of converting specified addresses.

The characteristics c1 obtained by rotating the graph line a indicating the original input gray level-output gray level characteristics shown in FIG. 15 through a predetermined angle in a counterclockwise direction are obtained by converting base addresses Oadr by the same expression (13) as the foregoing expression (3):

$$Sadr=255-\{Gain\ (255-Oadr)+Offset\} \qquad (13)$$

In this case, the value of Offset is always 0. Gain is so determined, if the designated copy density is higher than the reference copy density, that it takes a value smaller than 1 and that the higher the designated copy density is, the smaller the value is. On the other hand, Gain is so determined, if the designated copy density is lower than the reference copy density, that it takes a value larger than 1 and that the lower the designated copy density is, the larger the value is.

If the specified addresses are converted by setting the value of Gain corresponding to the characteristics c1 shown in FIG. 15 to 1.1, the values of specified addresses obtained by the conversion Sadr corresponding to input gray level data 0 to (xL−1) (see FIGS. 15 and 16) become smaller than the minimum value 0 of the base addresses Oadr. Consequently, there exist no output gray level data corresponding to the input gray level data 0 to (xL−1).

In such a case, it is considered that the specified addresses Sadr corresponding to the input gray level data 0 to (xL−1) are set to the minimum value 0 of the base addresses Oadr. Consequently, output gray level data corresponding to the input gray level data 0 to (xL−1) are the same as output gray level data corresponding to the input gray level data xL. The output gray level data corresponding to the input gray level data 0 to (xL−1) are graphically indicated by a straight portion c10 in FIG. 15.

In the seventh method, the output gray level data corresponding to the input gray level data which correspond to the specified addresses Sadr whose values are smaller than 0 (the input gray levels 0 to (xL−1) in the above described example) are found in the same method as the fifth method described in the item (V-1-1) or the sixth method described in the item (VI-2-1). Input gray level-output gray level characteristics thus obtained are indicated by the graph line c2 in FIG. 16. Specifically, this graph line c2 is obtained by rotating the graph line a indicating the original input gray level-output gray level characteristics through a predetermined angle in a counterclockwise direction around a point, which corresponds to the highest output gray level, on the graph line a and indicating input gray level-output gray level characteristics corresponding to the input gray levels 0 to (xL−1) by a straight portion c20 which is a straight line passing through a point, which corresponds to the input gray level data xL, on a graph line obtained by the rotation and having a gradient θ of 45°.

(VII-1-2) Description is now made of processing actually performed.

In the actual processing, specified addresses are not converted in the address generating circuit 12. Specifically, an address specifying signal used as the basis corresponding to a pixel in the dither matrix which corresponds to input gray level data and a pixel position signal is outputted from the address generating circuit 12. The CPU 10 reads out input gray level-output gray level data corresponding to a developing color and the designated copy density from the data ROM 11 and transfers the same to the RAM 14 on the basis of the developing color and the designated copy density.

This conversion of the transfer destination addresses is represented by the same expression (14) as the foregoing expression (4):

$$NTadr=\{OTadr+255\ (Gain-1)+Offset\} \div Gain \qquad (14)$$

In this case, the value of Offset is 0. The value of Gain corresponding to the designated copy density is previously determined and stored in the data ROM 11 or the other ROM. Base transfer destination addresses OTadr corresponding to respective input gray level-output gray level data in each of the areas $TE_0$, $TE_1$, $TE_2$ and $TE_3$ corresponding to the pixels $G_0$, $G_1$, $G_2$ and $G_3$ in the dither matrix are converted into new transfer destination addresses NTadr on the basis of the foregoing expression (14) from the value of Gain corresponding to the designated copy density.

If the designated copy density is lower than the reference copy density (Gain<1), blank transfer destination addresses at which there exist no data to be transferred are generated in a portion assigned small addresses in each of the areas $TE_0$, $TE_1$, $TE_2$ and $TE_3$ in the table memory 13 by the conversion of the transfer destination addresses. Therefore, output gray level data corresponding to the blank transfer destination addresses are generated.

If the blank transfer destination addresses at which there exist no data to be transferred are generated in a portion assigned small addresses in each of the areas $TE_0$, $TE_1$, $TE_2$ and $TE_3$ in the table memory 13, output gray level data corresponding to the blank transfer destination addresses are found in the same method as the fifth method described in the item (V-1-2) or the sixth method described in the item (VI-2-2). If output gray level data corresponding to the whole of each of the areas $TE_0$, $TE_1$, $TE_2$ and $TE_3$ in the table memory 13 are thus generated in the RAM 14, the data are transferred to the table memory 13 from the RAM 14. Thereafter, if an address specifying signal is outputted from the address generating circuit 12, data is outputted from a corresponding address in the table memory 13.

(VII-2) Description is made of a case where the designated copy density is higher than the reference copy density.

If the designated copy density is higher than the reference copy density, the original input gray level-output gray level characteristics are converted into characteristics obtained by rotating the graph line a indicating the original input gray level-output gray level characteristics shown in FIG. 15 or 16 through a predetermined angle in a clockwise direction around a point, which corresponds to the highest output gray level, on the graph line a. The input gray levels are converted on the basis of input gray level-output gray level data obtained by the conversion.

If the designated copy density is higher than the reference copy density (Gain<1), transfer destination addresses are converted by the foregoing expression (14), so that the original input gray level-output gray level data is transferred to the table memory 13. In this case, the values of new transfer destination addresses NTadr may, in some cases, be smaller than the minimum value 0 of the base addresses Oadr. However, data corresponding to the new transfer destination addresses are not transferred.

If the input gray level-output gray level characteristics obtained by the above described seventh method are compared with the original input gray level-output gray level characteristics, the value of an output gray level at a point on the characteristic curve is slightly changed from the value of an output gray level at a corresponding point on the original characteristic curve in a low density portion. However, the range of input gray levels which can be reproduced is not decreased, as compared with that in the fifth method.

(VIII) Eighth Method

Figure 18:
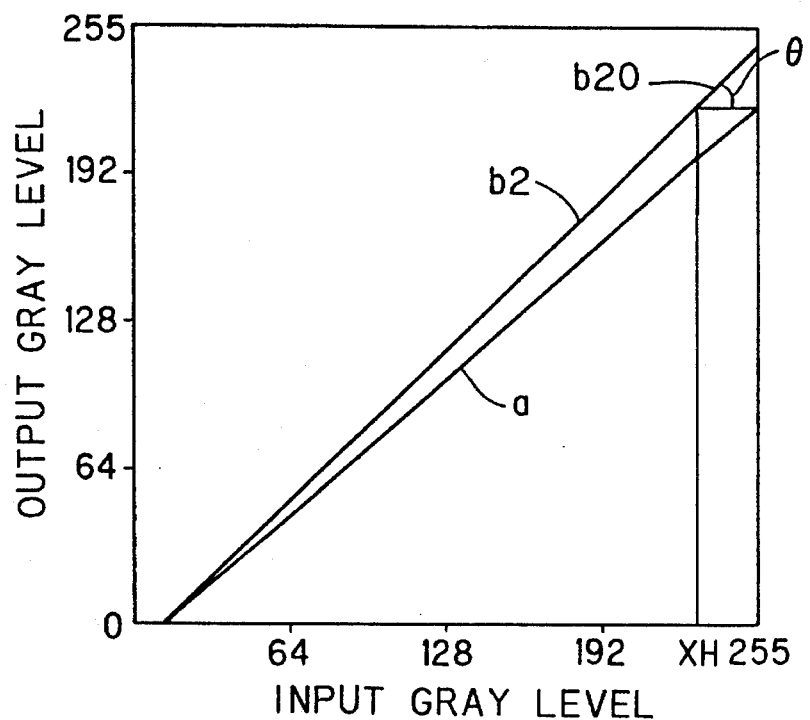
FIG. 18 is a graph showing input gray level-output gray level characteristics obtained when the eighth method is used.
Figure 19:
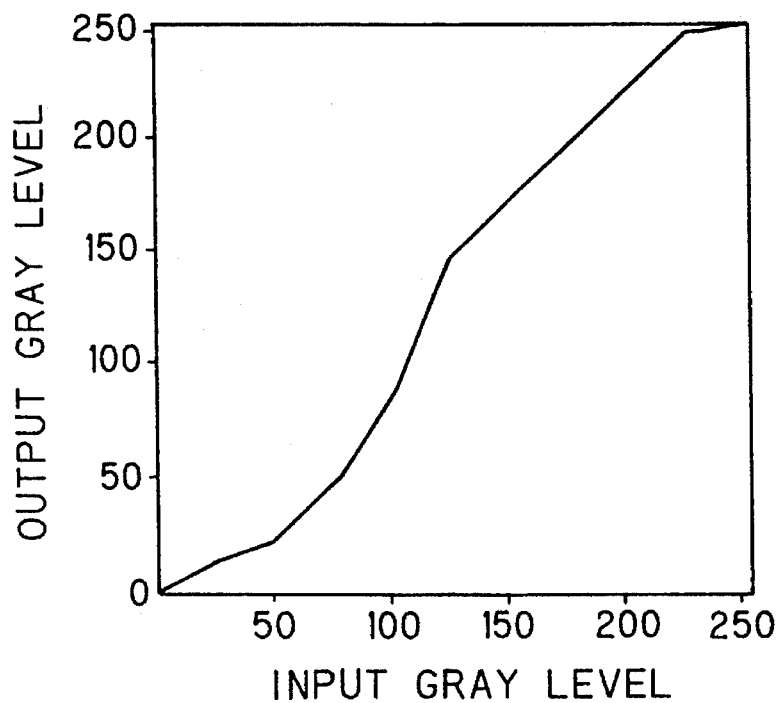
FIG. 19 is a graph showing one example of the original input gray level-output gray level characteristics.
Figure 20:
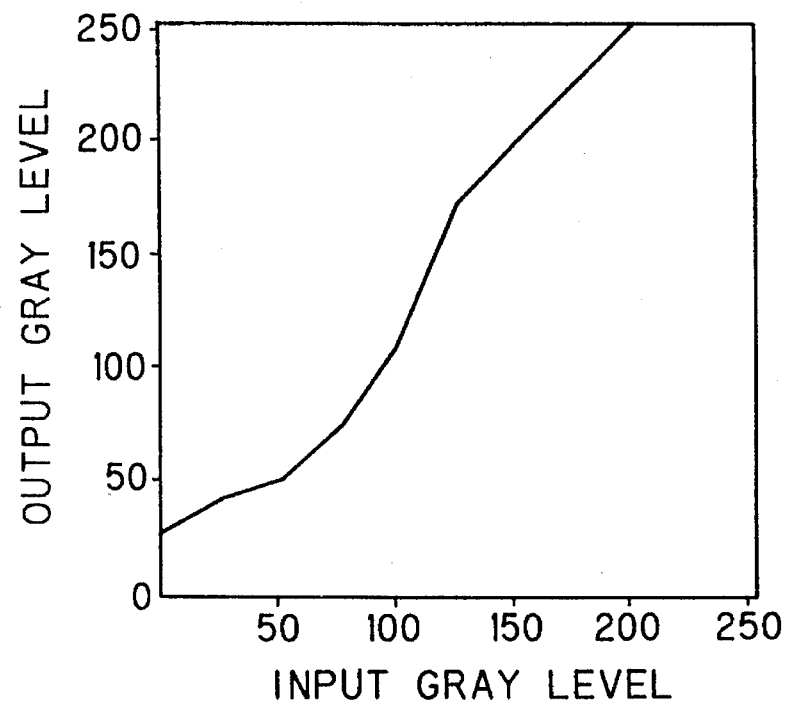
FIG. 20 is a graph showing input gray level-output gray level characteristics obtained by shifting the original input gray level-output gray level characteristics shown in FIG. 19 upward.

As shown in FIG. 18, the eighth method is one for rotating, in a case where input gray levels are used to enter the axis of abscissa, output gray levels are used to enter the axis of ordinate, and the original input gray level-output gray level characteristics are indicated by a graph line a, the graph line a through a predetermined angle in a clockwise direction or in a counterclockwise direction around a point, which corresponds to the lowest output gray level, on the graph line a depending on the designated copy density, to convert the input gray level-output gray level characteristics into characteristics corresponding to the designated copy density, and finding output gray levels relative to input gray levels at which there exists no output gray level data as the result of the above described conversion by a predetermined operation.

(VIII-1) Description is now made of the idea of the eighth method by taking as an example a case where the designated copy density is higher than the reference copy density.

Figure 17:
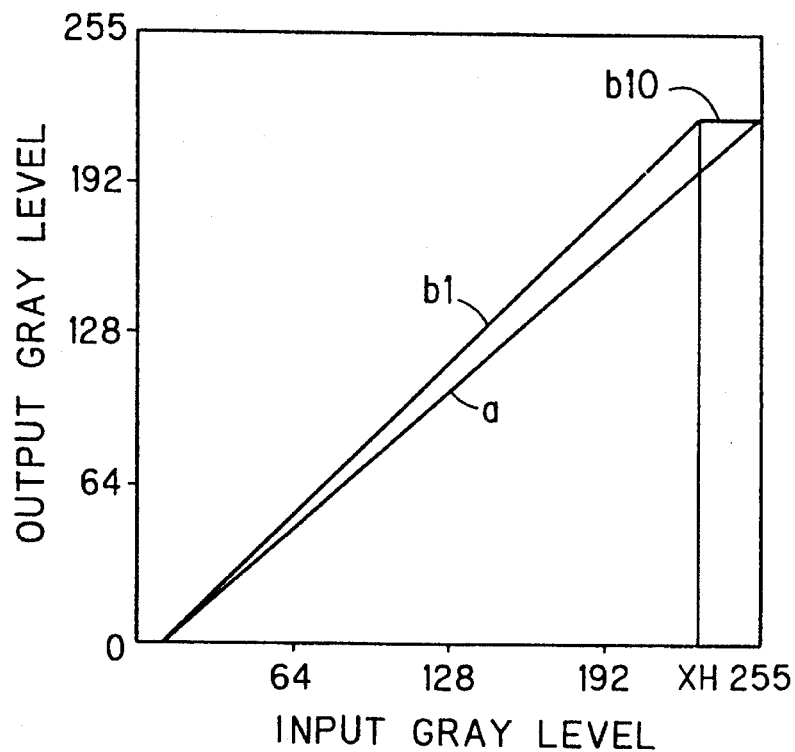
FIG. 17 is a graph showing input gray level-output gray level characteristics for explaining an eighth method.

FIGS. 17 and 18 show input gray level-output gray level characteristics in a case where input gray levels are used to enter the axis of abscissa and output gray levels are used to enter the axis of ordinate. A graph line a shown in FIGS. 17 and 18 indicates the original input gray level-output gray level characteristics. When the designated copy density is higher than the reference copy density, the original input gray level-output gray level characteristics are converted into characteristics obtained by rotating the graph line a indicating the original input gray level-output gray level characteristics through a predetermined angle in a counterclockwise direction around a point, which corresponds to the lowest output gray level, on the graph line a, as indicated by a graph line b1 in FIG. 17. The angle of rotation is set to a value corresponding to the designated copy density. If the graph line a indicating the original input gray level-output gray level characteristics is merely rotated in a counterclockwise direction, no input gray level-output gray level data exist in a portion at high input gray levels. Accordingly, input gray level-output gray level data in the portion are indicated by a graph line c20 in FIG. 18 which is a straight line having a gradient θ of, for example, 45°. The input gray levels are thus converted on the basis of input gray level-output copy density gray level data c2 found.

(VIII-1-1) Description is made of a case where the designated copy density is higher than the reference copy density using the idea of converting specified addresses.

The characteristics b1 obtained by rotating the graph line a indicating the original input gray level-output gray level characteristics shown in FIG. 17 through a predetermined angle in a counterclockwise direction are obtained by converting base addresses Oadr corresponding to input gray level data by the same expression (15) as the foregoing expression (5):

$$Sadr=255-\{Gain\ (255-Oadr)+Offset\} \qquad (15)$$

Gain is so determined, if the designated copy density is higher than the reference copy density, that it takes a value larger than 1 and that the higher the designated copy density is, the larger the value is. On the other hand, Gain is so determined, if the designated copy density is lower than the reference copy density, that it takes a value smaller than 1 and that the lower the designated copy the density is, the smaller the value is. In this case, the value of Offset is so adjusted that the value of {255. Gain +Offset} becomes 255.

If the specified addresses are converted using the values of Gain (>1) and Offset corresponding to the characteristics b1 shown in FIG. 17, the values of specified addresses obtained by the conversion Sadr corresponding to input gray level data (xH+1) to 255 (see FIGS. 17 and 18) become larger than the maximum value 255 of the base addresses Oadr. Consequently, there exist no output gray level data corresponding to the input gray level data (xH+ 1) to 255.

In such a case, it is considered that the specified address Sadr corresponding to the input gray level data (xH +1) to set are set to the maximum value 255 of the base addresses Oadr. Consequently, output gray level data corresponding to the input gray level data (xH+1) to 255 are the same as output gray level data corresponding to the input gray level data xH. The output gray level data corresponding to the input gray level data (xH+1) to 255 are graphically indicated by a straight portion b10 in FIG. 17.

In the eighth method, the output gray level data corresponding to the input gray level data which correspond to the specified address Sadr whose values are larger than 255 (the input gray levels (xH+1) to 255 in the above described example) are found in the same method as the fifth method described in the item (V-2-1) or the sixth method described in the item (VI-1-1). Input gray level-output gray level characteristics thus obtained are indicated by a graph line b2 in FIG. 18. Specifically, this graph line b2 is obtained by rotating the graph line a indicating the original input gray level-output gray level characteristics through a predetermined angle in a counterclockwise direction around a point, which corresponds to the lowest output gray level, on the graph line a and indicating input gray level-output gray level characteristics corresponding to the input gray levels (xH+1) to 255 by a straight portion b20 which is a straight line passing through a point, which corresponds to the input gray level data xH, on a graph line obtained by the rotation and having a gradient θ of 45°.

(VIII-1-2) Description is now made of processing actually performed.

In the actual processing, specified addresses are not converted in the address generating circuit 12. Specifically, an address specifying signal used as the basis corresponding to a pixel in the dither matrix which corresponds to input gray level data and a pixel position signal is outputted from the address generating circuit 12. The CPU 10 reads out input gray level-output gray level data corresponding to a developing color and the designated copy density from the data ROM 11 and transfers the same to the RAM 14 on the basis of the developing color and the designated copy density. This conversion of the transfer destination addresses is represented by the same expression (16) as the foregoing expression (6):

$$NTadr=\{OTadr+255\ (Gain-1)+Offset\} \div Gain \qquad (16)$$

The values of Gain and Offset corresponding to the designated copy density are previously determined and stored in the data ROM 11 or the other ROM. Base transfer destination addresses OTadr corresponding to respective input gray level-output gray level data in each of the areas $TE_0$, $TE_1$, $TE_2$ and $TE_3$ corresponding to the pixels $G_0$, $G_1$, $G_2$ and $G_3$ in the dither matrix are converted into new transfer destination addresses NTadr on the basis of the foregoing expression (16) from the values of Gain and Offset corresponding to the designated copy density.

If the designated copy density is higher than the reference copy density (Gain>1), blank transfer destination addresses at which there exist no data to be transferred are generated in a portion assigned large addresses in each of the areas $TE_0$, $TE_1$, $TE_2$ and $TE_3$ in the table memory 13 by the conversion of the transfer destination addresses. Therefore, output gray level data corresponding to the blank transfer destination addresses are generated.

if the blank transfer destination addresses at which there exist no data to be transferred are generated in a portion assigned large addresses in each of the areas $TE_0$, $TE_1$, $TE_2$ and $TE_3$ in the table memory 13, output gray level data corresponding to the blank transfer destination addresses are found in the same method as the fifth method described in the item (V-2-2) or the sixth method described in the item (VI-1-2). If output gray level data corresponding to the whole of each of the areas $TE_0$, $TE_1$, $TE_2$ and $TE_3$ in the table memory 13 are thus generated in the RAM 14, the data are transferred to the table memory 13 from the RAM 14. Thereafter, if an address specifying signal is outputted from the address generating circuit 12, data is outputted from a corresponding address in the table memory 13.

(VIII-2) Description is made of a case where the designated copy density is higher than the reference copy density.

If the designated copy density is lower than the reference copy density, the original input gray level-output gray level characteristics are converted into characteristics obtained by rotating the graph line a indicating the original input gray level-output gray level characteristics shown in FIG. 17 or 18 through a predetermined angle in a clockwise direction around a point, which corresponds to the lowest output gray level, on the graph line a. The input gray levels are converted on the basis of input gray level-output gray level data obtained by the conversion.

If the designated copy density is lower than the reference copy density (Gain<1), transfer destination addresses are converted by the foregoing expression (16), so that the original input gray level-output gray level data is transferred to the table memory 13. In this case, the values of the new transfer destination addresses NTadr may, in some cases, be larger than the maximum value 255 of the base addresses Oadr. However, data corresponding to the new transfer destination addresses NTadr are not transferred.

If the input gray level-output gray level characteristics obtained by the above described eighth method are compared with the original input gray level-output gray level characteristics, the value of an output gray level at a point on the characteristic curve is slightly changed from the value of an output gray level at a corresponding point on the original characteristic curve in a low density portion. However, the range of input gray levels which can be reproduced is not decreased, as compared with that in the first method.

(IX) Ninth Method

The ninth method is a method using the eighth method when the copy density designated in the operating section is higher than the reference copy density and using the seventh method when the copy density designated in the operating section is lower than the reference copy density.

Specifically, when the designated copy density is higher than the reference copy density, the eighth method is so used, in a case where the original input gray level-output gray level characteristics are indicated by the graph line a in FIG. 18, that the original input gray level-output gray level characteristics are converted into characteristics indicated by the graph line b2. On the other hand, when the designated copy density is lower than the reference copy density, the seventh method is so used, in a case where the original input gray level-output gray level characteristics are indicated by the graph line a in FIG. 16, that the original input gray level-output gray level characteristics are converted into characteristics indicated by the graph line c2. In this case, as a formula for converting transfer destination addresses, the expression (16) common to the seventh and eighth methods is used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a density processing method in which input gray level-output gray level data representing an output gray level relative to an input gray level are previously generated and stored in a first storing means, the input gray level-output gray level data are transferred to a second storing means, and an address in the second storing means is specified on the basis of input gray level data inputted so that output gray level data stored in the specified address in the second storing means is outputted, wherein access addresses to the second storing means are converted by adding or subtracting a value corresponding to a designated copy density, thereby to convert input gray level-output gray level characteristics into characteristics corresponding to the designated copy density.

2. The density processing method according to claim 1, wherein the access addresses to said second storing means are transfer destination addresses from the first storing means to the second storing means corresponding to the input gray level-output gray level data.

3. The density processing method according to claim 1, wherein the access addresses to said second storing means are specified addresses in the second storing means corresponding to the input gray level data inputted.

4. In a density processing method in which input gray level-output gray level data representing an output gray level relative to an input gray level are previously generated and stored in a first storing means, the input gray level-output gray level data are transferred to a second storing means, and an address in the second storing means is specified on the basis of input gray level data inputted so that output gray level data stored in the specified address in the second storing means is outputted, wherein access addresses to the second storing means are converted depending on a designated copy density, thereby to convert input gray level-output gray level characteristics into characteristics corresponding to the designated copy density, wherein the access addresses to the second storing means are converted such that, if the designated copy density is higher than a reference copy density, a rate of increase of an output gray level relative to an input gray level is higher in a lower density portion, and the higher the designated copy density is, the higher the rate of increase thereof is, thereby to convert the input gray level-output gray level characteristics into characteristics corresponding to the designated copy density.

5. The density processing method according to claim 4, wherein the access addresses to said second storing means are transfer destination addresses from the first storing means to the second storing means corresponding to the input gray level-output gray level data.

6. The density processing method according to claim 4, wherein the access addresses to said second storing means are specified addresses in the second storing means corresponding to the input gray level data inputted.

7. In a density processing method in which input gray level-output gray level data representing an output gray level relative to an input gray level are previously generated and stored in a first storing means, the input gray level-output gray level data are transferred to a second storing means, and an address in the second storing means is specified on the basis of input gray level data inputted so that output gray level data stored in the specified address in the second storing means is outputted, wherein access addresses to the second storing means are converted depending on a designated copy density, thereby to convert input gray level-output gray level characteristics into characteristics corresponding to the designated copy density, wherein the access addresses to the second storing means are converted such that, if the designated copy density is lower than a reference copy density, a rate of decrease of an output gray level relative to an input gray level is higher in a higher density portion, and the lower the designated copy density is, the higher the rate of decrease thereof is, thereby to convert the input gray level-output gray level characteristics into characteristics corresponding to the designated copy density.

8. The density processing method according to claim 7, wherein the access addresses to said second storing means are transfer destination addresses from the first storing means to the second storing means corresponding to the input gray level-output gray level data.

9. The density processing method according to claim 7, wherein the access addresses to said second storing means are specified addresses in the second storing means corresponding to the input gray level data inputted.

10. In a density processing method in which input gray level-output gray level data representing an output gray level relative to an input gray level are previously generated and stored in a first storing means, the input gray level-output gray level data are transferred to a second storing means, and an address in the second storing means is specified on the basis of input gray level data inputted so that output gray level data stored in the specified address in the second storing means is outputted, wherein access addresses to the second storing means are converted depending on a designated copy density, thereby to convert input gray level-output gray level characteristics into characteristics corresponding to the designated copy density, wherein the access addresses to the second storing means are converted such that, if the designated copy density is higher than a reference copy density, a rate of increase of an output gray level relative to an input gray level is higher in a lower density portion, and the higher the designated copy density is, the higher the rate of increase thereof is, and wherein the access addresses to the second storing means are converted such that, if the designated copy density is lower than the reference copy density, a rate of decrease of an output gray level relative to an input gray level is higher in a higher density portion, and the lower the designated copy density is, the higher the rate of decrease thereof is, thereby to convert the input gray level-output gray level characteristics into characteristics corresponding to the designated copy density.

11. The density processing method according to claim 10, wherein the access addresses to said second storing means are transfer destination addresses from the first storing means to the second storing means corresponding to the input gray level-output gray level data.

12. The density processing method according to claim 10, wherein the access addresses to said second storing means are specified addresses in the second storing means corresponding to the input gray level data inputted.

13. In a density processing method in which input gray level-output gray level data are previously generated and stored in a first storing means, the input gray level-output gray level data are transferred to a second storing means, and an address in the second storing means is specified on the basis of input gray level data inputted so that output gray level data stored in the specified address in the second storing means is outputted, the density processing method comprising the steps of:

converting transfer destination addresses to the second storing means corresponding to the input gray level-output gray level data depending on a designated copy density;

finding, when blank transfer destination addresses which do not exist in transfer destination addresses obtained by the conversion exist in portions assigned small addresses of storage areas holding the input gray level-output gray level data in the second storing means, output gray level data corresponding to the blank transfer destination addresses on the basis of output gray level data corresponding to a minimum value of the transfer destination addresses obtained by the conversion; and generating new output gray level data corresponding to all the storage areas holding the input gray level-output gray level data in the second storing means from said steps to transfer the same to the second storing means.

14. In a density processing method in which input gray level-output gray level data are previously generated and stored in a first storing means, the input gray level-output gray level data are transferred to a second storing means, and an address in the second storing means is specified on the basis of input gray level data inputted so that output gray level data stored in the specified address in the second storing means is outputted, the density processing method comprising the steps of:

converting transfer destination addresses to the second storing means corresponding to the input gray level-output gray level data depending on a designated copy density;

finding, when blank transfer destination addresses which do not exist in transfer destination addresses obtained by the conversion exist in portions assigned large addresses in storage areas holding the input gray level output gray level data in the second storing means, output gray level data corresponding to the blank transfer destination addresses on the basis of output gray level data corresponding to a maximum value of the transfer destination addresses obtained by the conversion; and generating new output gray level data corresponding to all the storage areas holding the input gray level-output gray level data in the second storing means from said steps to transfer the same to the second storing means.

15. In a density processing method in which input gray level-output gray level data are previously generated and stored in a first storing means, the input gray level-output gray level data are transferred to a second storing means, and an address in the second storing means is specified on the basis of input gray level data inputted so that output gray level data stored in the specified address in the second storing means is outputted, the density processing method comprising the steps of:

converting transfer destination addresses to the second storing means corresponding to the input gray level-output gray level data depending on a designated copy density;

finding, when blank transfer destination addresses which do not exist in transfer destination addresses obtained by the conversion exist in portions assigned small addresses in storage areas holding the input gray level output gray level data in the second storing means, output gray level data corresponding to the blank transfer destination addresses on the basis of output gray level data corresponding to a minimum value of the transfer destination addresses obtained by the conversion;

finding, when blank transfer destination addresses which do not exist in the transfer destination addresses obtained by the conversion exist in portions assigned large addresses in the storage areas holding the input gray level-output gray level data in the second storing means, output gray level data corresponding to the blank transfer destination addresses on the basis of output gray level data corresponding to a maximum value of the transfer destination addresses obtained by the conversion; and generating new output gray level data corresponding to all the storage areas holding the input gray level-output gray level data in the second storing means from said steps to transfer the same to the second storing means.

16. In a density processing method in which input gray level-output gray level data are previously generated using a dither matrix and stored in a first storing means, the input gray level-output gray level data are transferred to a second storing means, and an address in the second storing means is specified on the basis of input gray level data inputted so that output gray level data stored in the specified address in the second storing means is outputted, the density processing method comprising the steps of:

converting transfer destination addresses to the second storing means corresponding to the input gray level-output gray level data depending on a designated copy density;

finding, when blank transfer destination addresses which do not exist in transfer destination addresses obtained by the conversion exist in portions assigned small addresses in storage areas holding the input gray level-output gray level data in the second storing means, patterns of output gray level data corresponding to the blank transfer destination addresses on the basis of the original input gray level-output gray level data to find the output gray level data corresponding to the blank transfer destination addresses on the basis of the patterns found and output gray level data corresponding to a minimum value of the transfer destination addresses obtained by the conversion; and generating new output gray level data corresponding to all the storage areas holding the input gray level-output gray level data in the second storing means from said steps to transfer the same to the second storing means.

17. In a density processing method in which input gray level-output gray level data are previously generated using a dither matrix and stored in a first storing means, the input gray level-output gray level data are transferred to a second storing means, and an address in the second storing means is specified on the basis of input gray level data inputted so that output gray level data stored in the specified address in the second storing means is outputted, the density processing method comprising the steps of:

converting transfer destination addresses to the second storing means corresponding to the input gray level-output gray level data depending on a designated copy density;

finding, when blank transfer destination addresses which do not exist in transfer destination addresses obtained by the conversion exist in portions assigned large addresses in storage areas holding the input gray level output gray level data in the second storing means, patterns of output gray level data corresponding to the blank transfer destination addresses on the basis of the original input gray level-output gray level data to find the output gray level data corresponding to the blank transfer destination addresses on the basis of the patterns found and output gray level data corresponding to a maximum value of the transfer destination addresses obtained by the conversion; and generating new output gray level data corresponding to all the storage areas holding the input gray level-output gray level data in the second storing means from said steps to transfer the same to the second storing means.

18. In a density processing method in which input gray level-output gray level data are previously generated using a dither matrix and stored in a first storing means, the input gray level-output gray level data are transferred to a second storing means, and an address in the second storing means is specified on the basis of input gray level data inputted so that output gray level data stored in the specified address in the second storing means is outputted, the density processing method comprising the steps of:

converting transfer destination addresses to the second storing means corresponding to the input gray level-output gray level data depending on a designated copy density;

finding, when blank transfer destination addresses which do not exist in transfer destination addresses obtained by the conversion exist in portions assigned small addresses in storage areas holding the input gray level output gray level data in the second storing means, patterns of output gray level data corresponding to the blank transfer destination addresses on the basis of the original input gray level-output gray level data to find the output gray level data corresponding to the blank transfer destination addresses on the basis of the patterns found and output gray level data corresponding to a minimum value of the transfer destination addresses obtained by the conversion;

finding, when blank transfer destination addresses which do not exist in the transfer destination addresses obtained by the conversion exist in portions assigned large addresses in the storage areas holding the input gray level-output gray level data in the second storing means, patterns of output gray level data corresponding to the blank transfer destination addresses on the basis of the original input gray level-output gray level data to find the output gray level data corresponding to the blank transfer destination addresses on the basis of the patterns found and output gray level data corresponding to a maximum value of the transfer destination addresses obtained by the conversion; and generating new output gray level data corresponding to all the storage areas holding the input gray level-output gray level data in the second storing means from said steps to transfer the same to the second storing means.

* * * * *